United States Patent
Choi et al.

(10) Patent No.: US 12,482,524 B2
(45) Date of Patent: *Nov. 25, 2025

(54) MEMORY DEVICE, OPERATING METHOD OF MEMORY DEVICE, AND MEMORY SYSTEM

(71) Applicant: SK hynix Inc., Icheon-si (KR)

(72) Inventors: Hyung Jin Choi, Icheon-si (KR); Chan Sik Park, Icheon-si (KR); Chan Hui Jeong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 222 days.

This patent is subject to a terminal disclaimer.

(21) Appl. No.: 18/365,035

(22) Filed: Aug. 3, 2023

(65) Prior Publication Data

US 2024/0265974 A1   Aug. 8, 2024

(30) Foreign Application Priority Data

Feb. 6, 2023   (KR) .................. 10-2023-0015669

(51) Int. Cl.
*G11C 16/24* (2006.01)
*G11C 16/04* (2006.01)
(Continued)

(52) U.S. Cl.
CPC .......... *G11C 16/12* (2013.01); *G11C 16/0483* (2013.01); *G11C 16/10* (2013.01);
(Continued)

(58) Field of Classification Search
CPC ..... G11C 16/12; G11C 16/24; G11C 11/5628; G11C 16/0483; G11C 16/10;
(Continued)

(56) References Cited

U.S. PATENT DOCUMENTS 6,643,188 B2   11/2003   Tanaka et al.
10,734,078 B2   8/2020   Lee
(Continued)

FOREIGN PATENT DOCUMENTS

KR   1020100000776 A   1/2010
KR   100965067 B1   6/2010
(Continued)

*Primary Examiner* — Amir Zarabian
*Assistant Examiner* — Justin Bryce Heisterkamp
(74) *Attorney, Agent, or Firm* — WILLIAM PARK AND ASSOCIATES LTD.

(57) ABSTRACT

A memory device includes: a memory cell array including a plurality of memory cells; a peripheral circuit including a plurality of page buffers respectively connected to the plurality of memory cells through a plurality of bit lines and a voltage generating circuit for selectively outputting a program voltage and a verify voltage; and a control circuit configured to control the peripheral circuit to perform a plurality of program loops each including a program voltage apply operation and a verify operation. Each of the plurality of page buffers may include: a first latch for storing a verify result according to the verify operation of an nth program loop among the plurality of program loops; and a second latch for storing a verify result according to the verify operation of an (n–1)th program loop among the plurality of program loops.

17 Claims, 15 Drawing Sheets

(51) Int. Cl.
  *G11C 16/10*   (2006.01)
  *G11C 16/12*   (2006.01)
  *G11C 16/34*   (2006.01)
(52) U.S. Cl.
  CPC .............. *G11C 16/24* (2013.01); *G11C 16/34* (2013.01); *G11C 16/3459* (2013.01)
(58) Field of Classification Search
  CPC ..... G11C 16/3459; G11C 16/08; G11C 16/34; G11C 16/30
  See application file for complete search history.

(56) References Cited

U.S. PATENT DOCUMENTS

| | | | |
|---|---|---|---|
| 11,367,492 B2* | 6/2022 | Choi | .................. G11C 11/5628 |
| 2011/0051514 A1 | 3/2011 | Han et al. | |
| 2013/0094294 A1* | 4/2013 | Kwak | .................... H10B 43/35 |
| | | | 365/185.24 |
| 2019/0333593 A1* | 10/2019 | Lee | ........................ G11C 16/30 |
| 2021/0391026 A1* | 12/2021 | Choi | ...................... G11C 16/08 |
| 2022/0036950 A1* | 2/2022 | Choi | .................. G11C 16/3459 |
| 2022/0189557 A1* | 6/2022 | Kim | .................. G11C 16/3459 |
| 2022/0230691 A1* | 7/2022 | Choi | .................. G11C 11/5628 |
| 2022/0270697 A1* | 8/2022 | Hwang | .............. G11C 16/3459 |
| 2023/0102395 A1* | 3/2023 | Mun | .................. G11C 11/5628 |
| | | | 365/185.22 |
| 2023/0290388 A1* | 9/2023 | Du | ........................ G11C 7/106 |
| 2023/0298679 A1* | 9/2023 | Mun | .................. G11C 11/5628 |
| 2024/0177784 A1* | 5/2024 | Choi | .................. G11C 16/3459 |

FOREIGN PATENT DOCUMENTS

| | | |
|---|---|---|
| KR | 1020130129700 A | 11/2013 |
| KR | 101343597 B1 | 12/2013 |
| KR | 1020180057431 A | 5/2018 |

* cited by examiner

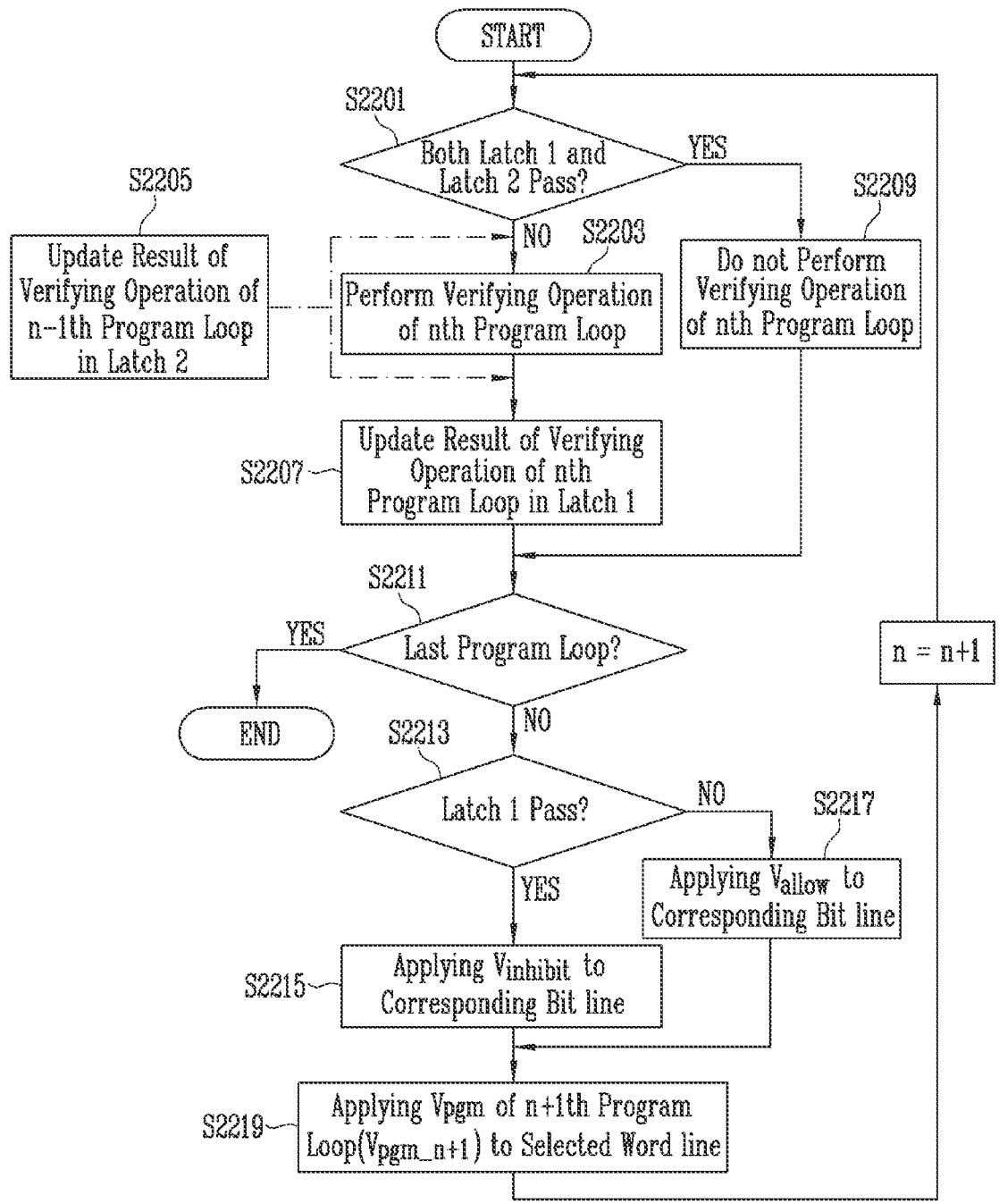

MEMORY DEVICE, OPERATING METHOD OF MEMORY DEVICE, AND MEMORY SYSTEM

CROSS-REFERENCE TO RELATED APPLICATION

The present application claims priority under 35 U.S.C. § 119(a) to Korean patent application number 10-2023-0015669 filed on Feb. 6, 2023, in the Korean Intellectual Property Office, the entire disclosure of which is incorporated by reference herein.

BACKGROUND

1. Technical Field

The present disclosure generally relates to a memory device, an operating method of a memory device, and a memory system.

2. Related Art

In a nonvolatile memory device, after a program voltage is applied to program a memory cell, it is to be determined whether the memory cell has been programmed to have a required data value. Such an operation is referred to as a verify operation. In general, a program voltage apply operation and a verify operation constitute one loop (cycle), and the loop will be repeated within a predetermined number of times. For example, after a memory cell is programmed, it will be determined whether a threshold voltage of the programmed memory cell is higher than a verify voltage in a state in which the verify voltage is applied to a selected word line. When it is determined that the threshold voltage of the programmed memory cell is higher than the verify voltage, a program operation of the memory cell will not be performed in a next loop. After that, the memory cell will be defined as an end cell. On the other hand, when it is determined that the threshold voltage of the programmed memory cell is lower than the verify voltage, a program voltage apply operation of the memory cell will be performed in the next loop. As a program loop is repeated, the number of program end cells will gradually increase. In other words, as the program loops are repeated, the number of memory cells to be programmed (or the number of bits to be programmed) will gradually decrease. However, an error may occur in the verify operation due to several causes, or a threshold voltage may become low as program end cells are degraded. Accordingly, a plan for reducing an error of the verify operation of the nonvolatile memory device or degradation of program end cells is required.

SUMMARY

Some embodiments are directed to a memory device, an operating method of a memory device, and a memory system, which can reduce an error of a verify operation or degradation of program end cells.

In accordance with an embodiment of the present disclosure is a memory device including: a memory cell array including a plurality of memory cells; a peripheral circuit including a plurality of page buffers respectively connected to the plurality of memory cells through a plurality of bit lines and a voltage generating circuit configured to selectively output a program voltage and a verify voltage; and a control circuit configured to control the peripheral circuit to perform a plurality of program loops each including a program voltage apply operation of applying a program voltage to selected memory cells among the memory cells and a verify operation of verifying a program state of the selected memory cells, based on the verify voltage, wherein each of the plurality of page buffers includes: a first latch configured to store a verify result according to the verify operation of an nth program loop among the plurality of program loops; and a second latch configured to store a verify result according to the verify operation of an (n−1)th program loop among the plurality of program loops, and wherein the control circuit determines a bit line voltage to be applied to each of the bit lines in an (n+1)th program loop among the plurality of program loops, based on the verify results stored in the first latch and the second latch.

In accordance with another embodiment of the present disclosure is a method of operating a memory device, the method including: performing an nth program loop including a program voltage apply operation and a verify operation on a selected memory cell among a plurality of memory cells; storing a verify result according to the verify operation of the nth program loop in a first latch of a page buffer connected to the selected memory cell through a bit line; and performing an (n+1)th program loop while applying, to the bit line, a bit line voltage determined based on a verify result according to a verify operation of an (n−1)th program loop, which is pre-stored in a second latch of the page buffer, and the verify result according to the verify operation of the nth program loop, which is stored in the first latch.

In accordance with still another embodiment of the present disclosure is a memory system including: a memory device including a plurality of memory cells, the memory device including a plurality of page buffers respectively connected to the plurality of memory cells through a plurality of bit lines; and a memory controller configured to control the memory device to perform a program operation when a write request is received from the outside, wherein the program operation includes a plurality of program loops each including a program voltage apply operation of applying a program voltage to selected memory cells among the memory cells and a verify operation of verifying a program state of the selected memory cells, wherein each of the plurality of page buffers includes: a first latch configured to store a verify result according to a verify operation of an nth program loop among the plurality of program loops; and a second latch configured to store a verify result according to a verify operation of an (n−1)th program loop among the plurality of program loops, and wherein bit line voltages to be respectively applied to the bit lines in an (n+1)th program loop among the plurality of program loops are determined based on the verify results stored in the first latch and the second latch.

BRIEF DESCRIPTION OF THE DRAWINGS

Example embodiments will now be described more fully hereinafter with reference to the accompanying drawings; however, they may be embodied in different forms and should not be construed as being limited to the embodiments set forth herein. Rather, these embodiments are provided so that this disclosure will be enabling to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 22 is a flowchart illustrating in more detail another partial operation shown in FIG. 20.

DETAILED DESCRIPTION

The specific structural and functional descriptions disclosed herein are merely illustrative for the purpose of describing embodiments according to the concept of the present disclosure. Embodiments according to the concept of the present disclosure can be implemented in various forms and should not be construed as being limited to the specific embodiments described herein.

Figure 1:
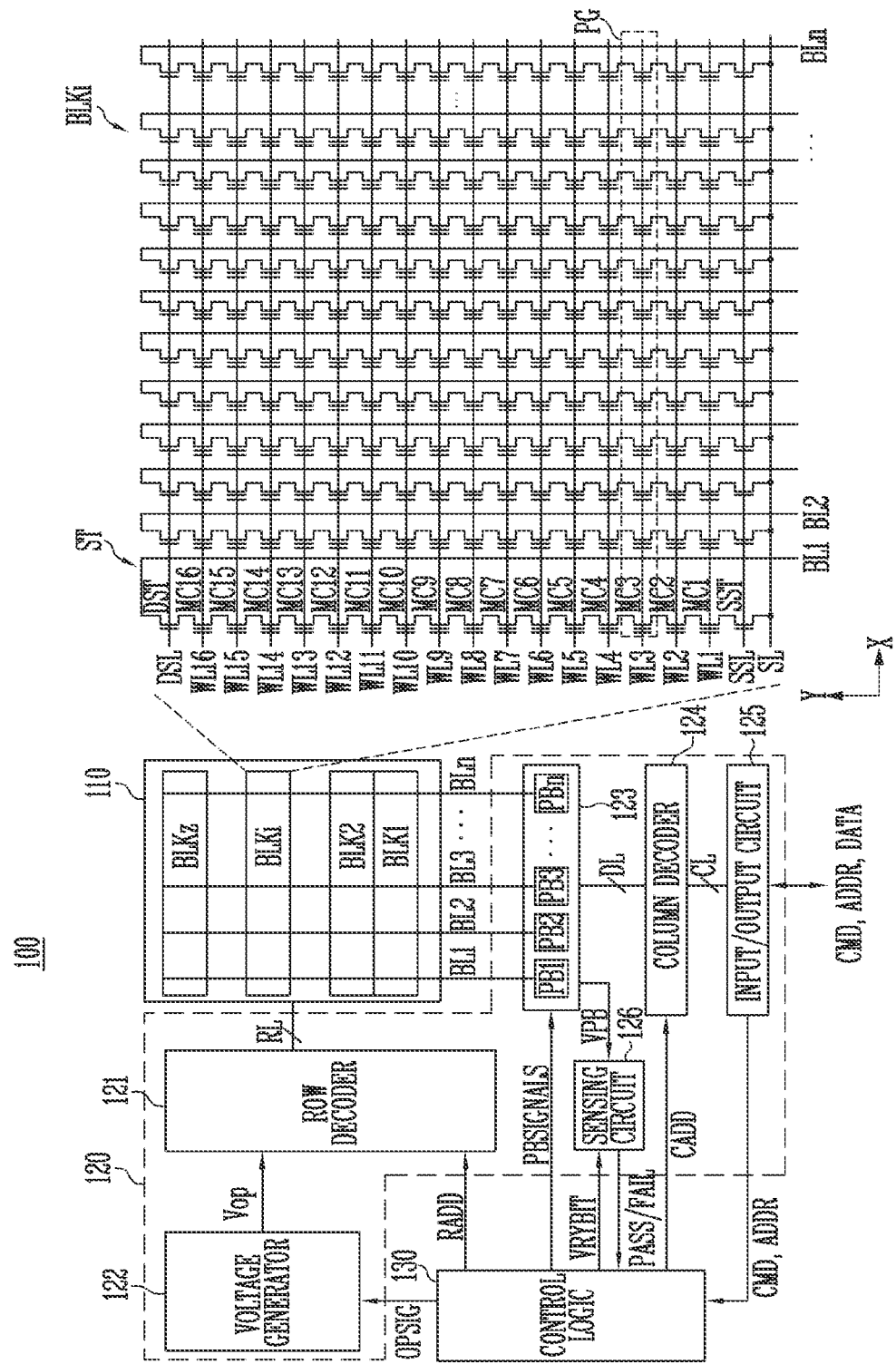
FIG. 1 is a block diagram illustrating a memory device in accordance with an embodiment of the present disclosure.

FIG. 1 is a block diagram illustrating a memory device in accordance with an embodiment of the present disclosure.

Referring to FIG. 1, the memory device 100 may include a memory cell array 110, a peripheral circuit 120, and control logic 130. The control logic 130 is also referred to herein as a control circuit.

The memory cell array 110 includes a plurality of memory blocks BLK1 to BLKz. The plurality of memory blocks BLK1 to BLKz may be connected to a row decoder 121 through row lines RL. The row lines RL may include at least one source select line, a plurality of word lines, and at least one drain select line. The plurality of memory blocks BLK1 to BLKz are connected to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells connected to the same word line may be defined as one page. Therefore, one memory block may include a plurality of pages.

In any one memory block BLKi among the plurality of memory blocks, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells MC1 to MC16, and a drain select transistor DST, which are connected in series to each other between the source line SL and the first bit line BL1. At least one source select transistor SST and at least one drain select transistor DST may be included in one string ST, and a number of memory cells greater than the number of the memory cells MC1 to MC16 shown in the drawing may be included in the one string ST.

A source terminal of the source select transistor SST may be connected to the source line SL, and a drain terminal of the drain select transistor DST may be connected to the first bit line BL1. The memory cells MC1 to MC16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells MC1 to MC16 may be connected to a plurality of word lines WL1 to WL16. A group of memory cells connected to the same word line among memory cells included in different strings ST may be referred to as a physical page PG. Therefore, a number of physical pages PG which corresponds to the number of the word lines WL1 to WL16 may be included in the memory block BLKi.

Each of the memory cells may be configured as a Single-Level Cell (SLC) storing one data bit, a Multi-Level Cell (MLC) storing two data bits, a Triple-Level Cell (TLC) storing three data bits, or a Quadruple-Level Cell (QLC) storing four data bits.

The SLC may store one-bit data. One physical page PG of the SLC may store one logical page data. One logical page of data may include a number of data bits which corresponds to the number of cells included in one physical page PG.

The MLC, the TLC, and the QLC may store two-or-more-bit data. One physical page PG may store two or more logical pages of data.

The peripheral circuit 120 may be configured to perform a program operation, a read operation, or an erase operation on a selected area of the memory cell array 110 under the control of the control logic 130. That is, the peripheral circuit 120 may drive the memory cell array 110 under the control of the control logic 130. For example, the peripheral circuit 120 may apply various operating voltages to the row lines RL and the bit lines BL1 to BLn or discharge the applied voltages under the control of the control logic 130.

Specifically, the peripheral circuit 120 may include the row decoder 121, a voltage generator 122, the page buffer group 123, a column decoder 124, an input/output circuit 125, and a sensing circuit 126. The voltage generator 122 is also referred to herein as a voltage generating circuit.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under the control of the control logic 130. The row decoder 121 may receive a row address RADD from the control logic 130. Specifically, the row decoder 121 may decode the row address RADD. The row decoder 121 may select at least one memory block among the memory blocks BLK1 to BLKz according to the decoded address. Also, the row decoder 121 may select at least one word line of the selected memory block to apply voltages generated by the voltage generator 122 to the at least one word line WL according to the decoded address.

For example, in a program operation, the row decoder 121 may apply a program voltage to the selected word line, and apply a program pass voltage having a level lower than a level of the program voltage to unselected word lines. In a program verify operation, the row decoder 121 may apply a verify voltage to the selected word line, and apply a verify pass voltage higher than the verify voltage to the unselected word lines. In a read operation, the row decoder 121 may apply a read voltage to the selected word line, and apply a read pass voltage higher than the read voltage to the unselected word lines.

In an embodiment, an erase operation of the memory device 100 may be performed in a memory block unit. In the erase operation, the row decoder 121 may select one memory block according to the decoded address. In the erase operation, the row decoder 121 may apply a ground voltage to word lines connected to the selected memory block.

The voltage generator 122 may operate under the control of the control logic 130. Specifically, the voltage generator 122 may generate a plurality of voltages by using an external power voltage supplied to the memory device 100 under the control of the control logic 130. For example, the voltage generator 122 may generate a program voltage, a verify voltage, a pass voltage, a read voltage, an erased voltage, and the like under the control of the control logic 130. That is, the voltage generator 122 may generate various operating voltages Vop used in program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages by using an external power voltage or an internal power voltage. For example, the voltage generator 122 may include a plurality of pumping capacitors for receiving the internal power voltage, and generate the plurality of voltages by selectively activating the plurality of pumping capacitors under the control of the control logic 130. In addition, the plurality of generated voltages may be supplied to the memory cell array 110 by the row decoder 121.

The page buffer group 123 may include first to nth page buffers PB1 to PBn. The first to nth page buffers PB1 to PBn may be connected to the memory cell array 110 respectively through first to nth bit lines BL1 to BLn. Also, the first to nth bit lines BL1 to BLn may operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page may be programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a program verify operation, the first to nth page buffers PB1 to PBn may read page data from the selected memory cells through the first to nth bit lines BL1 to BLn. In an embodiment, each of the page buffers PB1 to PBn may store verify results sensed with respect to memory cells connected through the bit lines BL1 to BLn in a verify operation. In an embodiment, each of the page buffers PB1 to PBn may store not only a verify result in a current program loop but also a verify result in a previous program loop.

The column decoder 124 may communicate data between the input/output circuit 125 and the page buffer group 123 in response to a column address CADD. For example, the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200, to the control logic 130, or exchange data DATA with the column decoder 124.

In a read operation or verify operation, the sensing circuit 126 may generate a reference current in response to an allow bit signal VRYBIT, and output a pass signal PASS or a fail signal FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit signal VRYBIT in response to the command CMD and the address ADDR. In an embodiment, the control logic 130 may control the peripheral circuit 120 to perform program loops. The control logic 130 may control the voltage generator 122 to generate an appropriate voltage, and control the row decoder 121 and the column decoder 124 such that an appropriate voltage is applied to word lines and bit lines, which are connected to the selected memory cells. In an embodiment, the control logic 130 may determine a bit line voltage to be applied to each of the bit lines BL1 to BLn when a program loop is performed, based on the verify result stored in each of the page buffers PB1 to PBn. The control logic 130 may be implemented as hardware, software, or a combination of hardware and software. For example, the control logic 130 may be a control logic circuit, or control circuit, operating in accordance with an algorithm and/or a processor executing control logic code.

Figure 2:
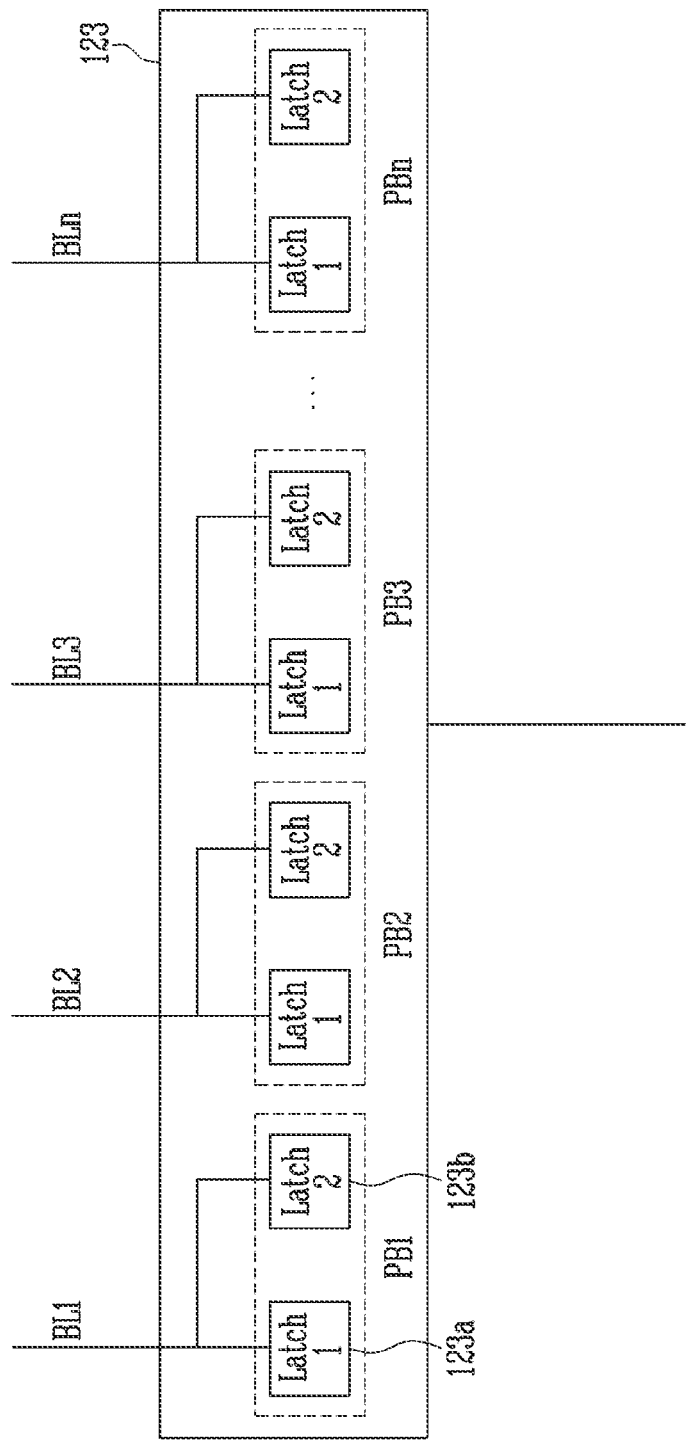
FIG. 2 is a diagram illustrating a page buffer group of the memory device in in accordance with an embodiment of the present disclosure.

FIG. 2 is a diagram illustrating a page buffer group of the memory device in in accordance with an embodiment of the present disclosure.

Referring to FIG. 2, the page buffer group 123 may include a plurality of page buffers PB1 to PBn. The page buffers PB1 to PBn may be connected to the memory cell array 110 respectively through the first to nth bit lines BL1 to BLn.

Each of the page buffers PB1 to PBn may include a first latch 123a and a second latch 123b. In an embodiment, each of the latches may be configured as a circuit including at least one NMOS transistor, at least one PMOS transistor, and at least one inverter, but the present disclosure is not limited to a specific form.

In an embodiment, the first latch 123a may store a newest verify result. For example, after a verify operation of an nth program loop being currently performed is completed, a verify result according to the verify operation of the nth program loop may be stored in the first latch 123a. Before the verify operation of the nth program loop being currently performed is completed, a verify result according to a verify operation of an (n−1)th program loop may be stored in the first latch 123a.

In an embodiment, the second latch 123b may store a previous verify result. For example, after the verify operation of the nth program loop being currently performed is completed, the verify result according to the verify operation of the (n−1)th program loop may be stored in the second latch 123b. Before the verify operation of the nth program loop being currently performed is completed, a verify result according to a verify operation of an (n−2)th program loop may be stored in the second latch 123b.

In this specification, n may mean an arbitrary natural number. In accordance with a specific embodiment, n may be a natural number of 1 or more, a natural number of 2 or more, a natural number of 3 or more, or the like, but the present disclosure is not limited thereto.

Figure 3:
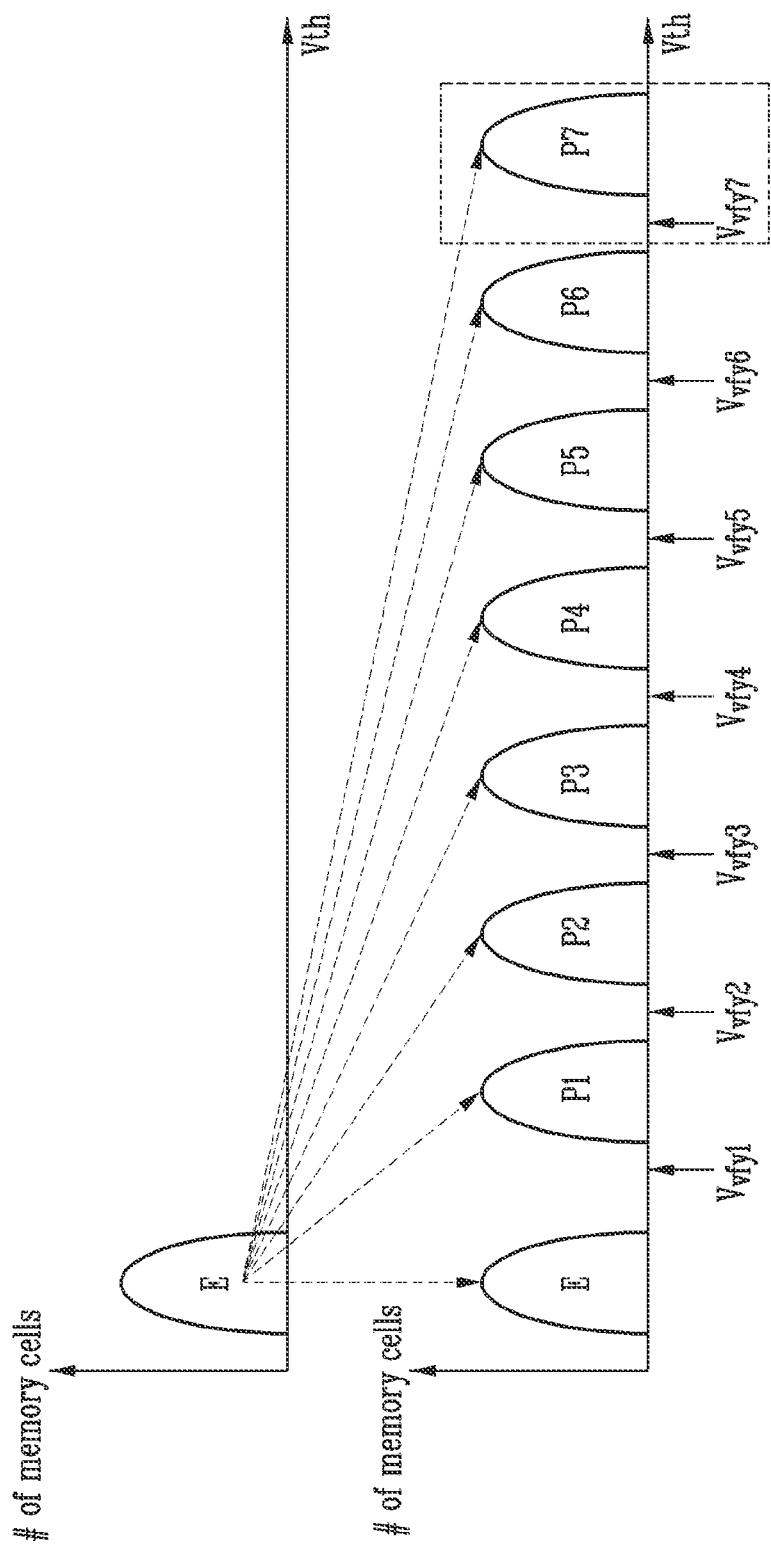
FIG. 3 is a diagram illustrating a program state of a memory cell in accordance with an embodiment of the present disclosure.

FIG. 3 is a diagram illustrating a program state of a memory cell in accordance with an embodiment of the present disclosure.

Referring to FIG. 3, a memory cell may be programmed to an erase state E or any one state among first to seventh program states P1 to P7 according to a threshold voltage. Although the memory cell shown in FIG. 3 is illustrated as a Triple-Level Cell (TLC) which can be programmed to one erase state or any one state among seven program states, this is merely an embodiment for convenience of description, and the memory cell may be implemented as a Multi-Level Cell (MLC), a Single-Level Cell (SLC), a Quad-Level Cell (QLC), or the like. In addition, the erase state and the program state are distinguished from each other for convenience of description, but the erase state may be expressed as a zeroth program state P0. Therefore, the erase state E and the first to seventh program states P1 to P7, which are shown in FIG. 3, may be expressed as zeroth to seventh program states.

Selected memory cells may have a threshold voltage included in the erase state E or any one state among the first to seventh program states P1 to P7. That is, the memory cells may be programmed to have a threshold voltage included in the erase state E or any one state among the first to seventh program states P1 to P7. The memory cells may be in the erase state E before a program operation is performed. In the program operation, the memory cells in the erase state E may be programmed to any one program state among the seven program states as a program voltage is applied to a selected word line.

In addition, the erase state E and the first to seventh program states P1 to P7 of memory cells may be distinguished from each other by using verify voltages. Specifically, adjacent program states of memory cells may be distinguished from each other by using verify voltages. For example, the erase state E and the first program state P1 may be distinguished from each other by a first verify voltage Vvfy1. The first program state P1 and the second program state P2 may be distinguished from each other by a second verify voltage Vvfy2. The second program state P2 and the third program state P3 may be distinguished from each other by a third verify voltage Vvfy3. The third program state P3 and the fourth program state P4 may be distinguished from each other by a fourth verify voltage Vvfy4. The fourth program state P4 and the fifth program state P5 may be distinguished from each other by a fifth verify voltage Vvfy5. The fifth program state P5 and the sixth program state P6 may be distinguished from each other by a sixth verify voltage Vvfy6. The sixth program state P6 and the seventh program state P7 may be distinguished from each other by a seventh verify voltage Vvfy7. For example, a threshold voltage distribution of memory cells corresponding to the first program state PV1 is equal to or higher than the first verify voltage Vvfy1 and is lower than the second verify voltage Vvfy2. A threshold voltage distribution of memory cells corresponding to the second program state PV2 is equal to or higher than the second verify voltage Vvfy2 and is lower than the third verify voltage Vvfy3.

In an embodiment, the erase state E may corresponding to data '111,' the first program state P1 may correspond to data '110,' the second program state P2 may correspond to data '101,' the third program state P3 may correspond to data '100,' the fourth program state P4 may correspond to data '011,' the fifth program state P5 may correspond to data '010,' the sixth program state P6 may correspond to data '001,' and the seventh program state P7 may correspond to data '000.' However, data corresponding to each program state is merely illustrative, and may be variously modified.

Figure 4:
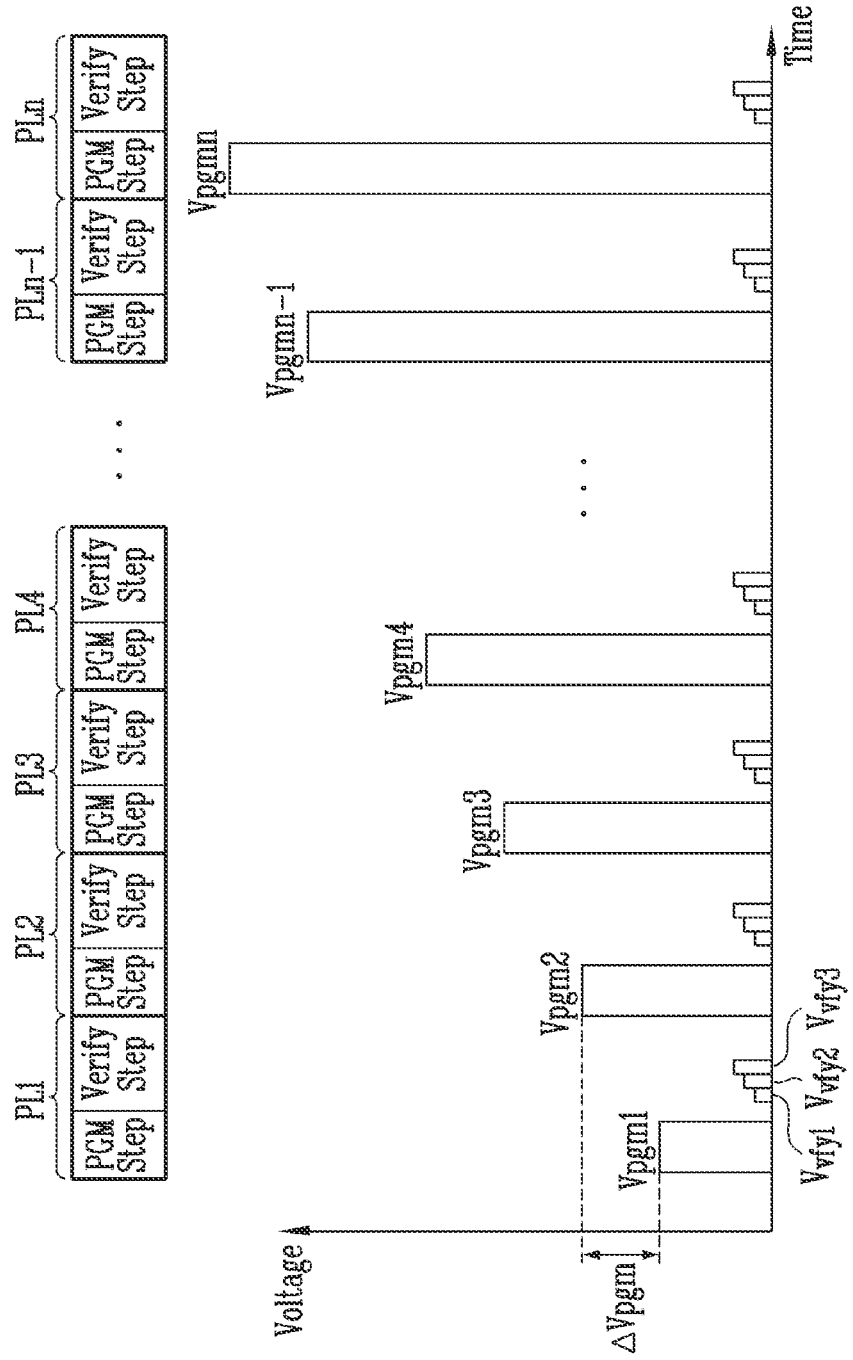
FIG. 4 is a diagram illustrating a program operation in accordance with an embodiment of the present disclosure.

FIG. 4 is a diagram illustrating a program operation in accordance with an embodiment of the present disclosure.

Referring to FIG. 4, the program operation may include a plurality of program loops PL1 to PLn. In FIG. 4, it is assumed that each of a plurality of memory cells is a Multi-Level Cell (MLC) storing 2-bit data. However, the scope of the present disclosure is not limited thereto. Each of the plurality of memory cells may be a Triple-Level Cell (TLC) storing 3-bit data or a Quad-Level Cell (QLC) storing 4-bit data.

That is, the memory device may program selected memory cells to have a threshold voltage corresponding to any one state among a plurality of program states by performing the plurality of program loops PL1 to PLn. Each of the plurality of program loops PL1 to PLn may include a program voltage apply step (PGM Step) of applying a program voltage and a verify step (Verify Step) of determining whether memory cells have been programmed by applying verify voltages.

For example, when a first program loop PL1 is performed, first to third verify voltages Vvfy1 to Vvfy3 may be sequentially applied to verify a program state of a plurality of memory cells after a first program pulse is applied. Verification on memory cells of which target program state is the first program state P1 may be performed by the first verify voltage Vvfy1, verification on memory cells of which target program state is the second program state P2 may be performed by the second verify voltage Vvfy2, and verification on memory cells of which target program state is the third program state P3 may be performed by the third verify voltage Vvfy3.

Memory cells which verify-passed by each of the verify voltages Vvfy1 to Vvfy3 may be determined to have a target program state, and then be program-inhibited in a second program loop PL2. In an embodiment, a second program pulse Vpgm2 higher by a unit voltage ΔVpgm than the first program pulse Vpgm1 may be applied to program the other memory cells except the memory cells program-inhibited in the second program loop PL2, but the present disclosure is not limited thereto. After that, a verify operation is performed identically to the verify operation of the first program loop PL1. For example, the verify pass indicates that a memory cell is read as an off-cell by a corresponding verify voltage.

As described above, when the memory device 100 programs an MLC storing 2-bit data, the memory device 100 verifies memory cells each having a program state as a target program state respectively by using the first to third verify voltages Vvfy1 to Vvfy3.

In a verify operation, a verify voltage may be applied to a selected word line as a word line to which selected memory cells are connected, and a page buffer may determine whether memory cells have been verify-passed, based on a current or voltage flowing through bit lines respectively connected to the selected memory cells.

As described above, the verify-passed memory cells may be determined to have a target program state, and then be program-inhibited in the second program loop PL2. However, a threshold voltage of the memory cells determined to have the target program state may become lower than a threshold voltage when the verify operation is performed, for a reason such as that electrons stored in a floating gate of the memory cells escape. Alternatively, there may occur a case where the threshold voltage of the memory cells is highly sensed even when the threshold voltage of the memory cells does not actually reach the target program state.

A memory device and an operating method of a memory device are needed which can reduce degradation of memory cells or an error of a verify operation. Thus, in a memory device and an operating method of a memory device in accordance with an embodiment of the present disclosure, verify-passed memory cells are not immediately determined to have a target program state and program-inhibited in a next program loop, but it may be determined whether the memory cells are memory cells which have been completely programmed, based on a verify operation performed once more in a subsequent program loop.

Figure 5:
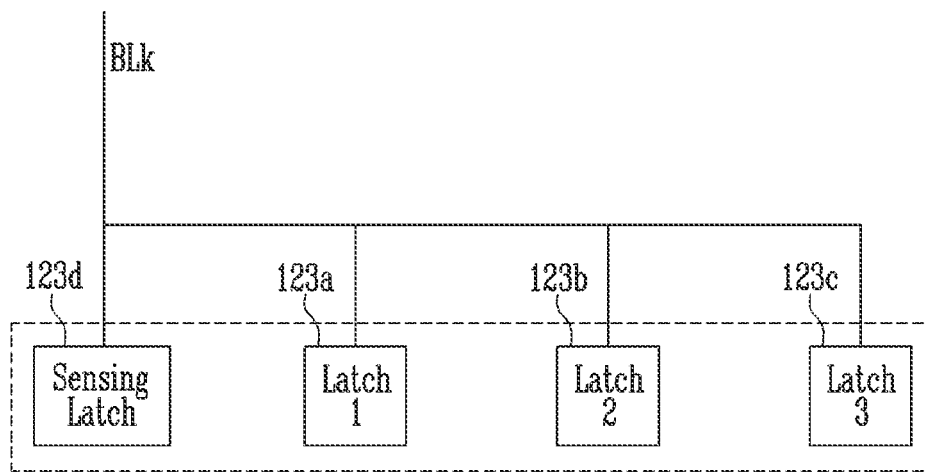
FIG. 5 is a diagram illustrating a page buffer included in the page buffer group shown in FIG. 2.

FIG. 5 is a diagram illustrating a page buffer included in the page buffer group shown in FIG. 2.

Referring to FIG. 5, the page buffer shown in FIG. 5 may be another example of the page buffer included in the page buffer group shown in FIG. 2.

The page buffer may include a first latch 123a and a second latch 123b.

In an embodiment, the first latch 123a may store a newest verify result. For example, after a verify operation of an nth program loop being currently performed is completed, a verify result according to the verify operation of the nth program loop may be stored in the first latch 123a. Before the verify operation of the nth program loop being currently performed is completed, a verify result according to a verify operation of an (n−1)th program loop may be stored in the first latch 123a.

In an embodiment, the second latch 123b may store a previous verify result. For example, after the verify operation of the nth program loop being currently performed is completed, the verify result according to the verify operation of the (n−1)th program loop may be stored in the second latch 123b. Before the verify operation of the nth program loop being currently performed is completed, a verify result according to a verify operation of an (n−2)th program loop may be stored in the second latch 123b.

That is, the first latch 123a and the second latch 123b may be identical to the first latch 123a and the second latch 123b, which are described in FIG. 2.

Also, the page buffer may further include a sensing latch 123d. The sensing latch 123d may be a latch in which data sensed from a memory cell in a verify operation is stored for the first time. That is, the sensing latch 123d may store a program verify result of a program loop being performed currently. In an embodiment, when program verification passes, the sensing latch 123d may store a first logic value. When the program verification fails, the sensing latch 123d may store an inverted first logic value.

Data stored in the sensing latch 123d, i.e., a verify result may be moved to the first latch 123a, and the verify result stored in the first latch 123a may be moved to the second latch 123b.

Also, the page buffer may further include a third latch 123c. The third latch 123c may store a verify result according to an auxiliary verify voltage for a double program operation.

Specific operations of the first latch 123a, the second latch 123b, the third latch 123c, and the sensing latch 123d will be described in more detail with reference to FIGS. 6 to 17.

FIGS. 6 to 15 are diagrams illustrating an example of an operation of the page buffer shown in FIG. 5.

Figure 6:
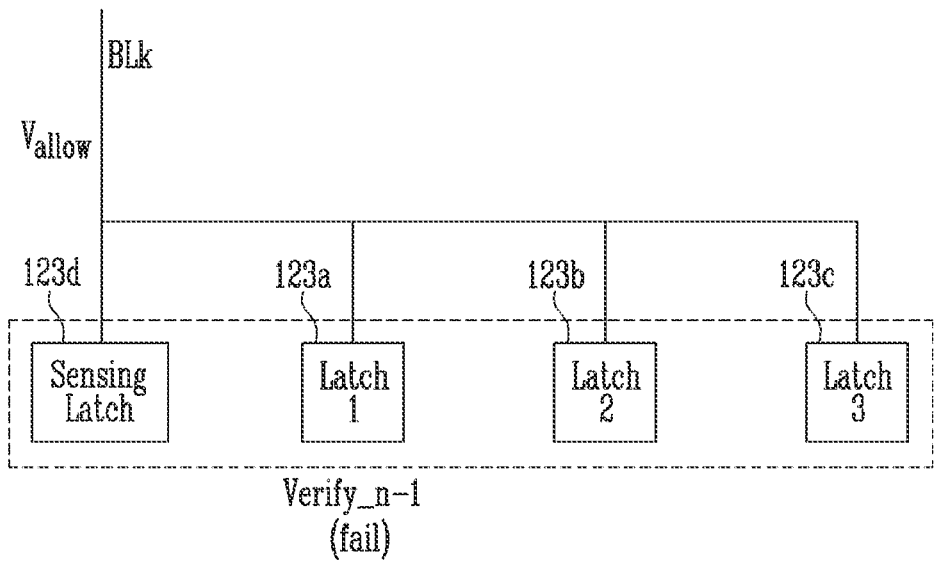
FIGS. 6 to 15 are diagrams illustrating an example of an operation of the page buffer shown in FIG. 5.

Referring to FIG. 6, a program voltage apply operation of the nth program loop may be performed. A verify result Verify_n−1 of the (n−1)th program loop may be stored in the first latch 123a. As the verify result stored in the first latch 123a represents a fail, a program allow voltage $V_{allow}$ may be applied to a bit line BLk connected to the page buffer. A program voltage $V_{pgm\_n}$ may be applied to a selected word line. Accordingly, a threshold voltage of a memory cell connected to the page buffer through the bit line BLk to which the program allow voltage $V_{allow}$ is applied may be changed by the program voltage $V_{pgm\_n}$.

Figure 7:
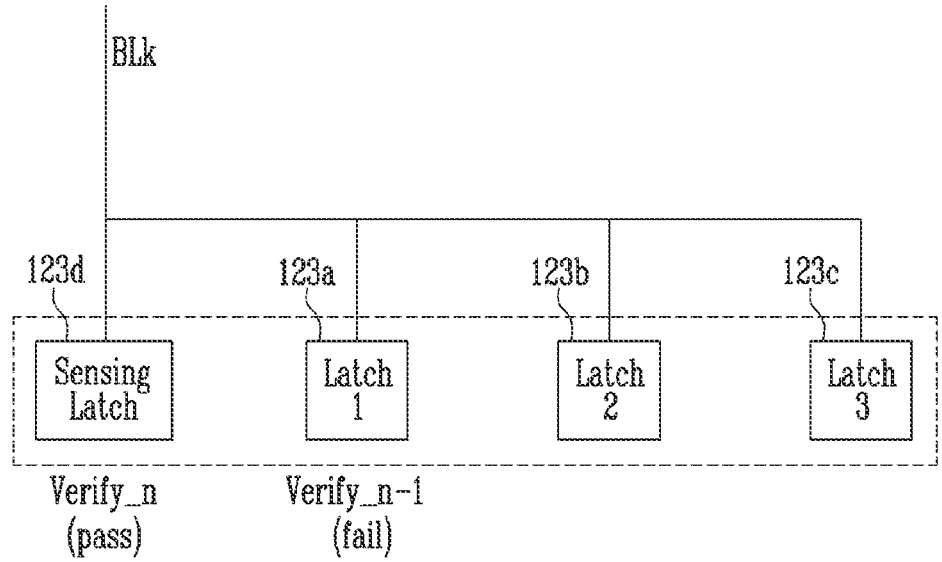

Referring to FIG. 7, a verify operation of the nth program loop may be performed on the memory cell connected to the page buffer through the bit line BLk. As a verify result stored in at least one of the first latch 123a and the second latch 123b represents a fail, the verify operation of the nth program loop may be performed on the memory cell connected to the page buffer through the bit line BLk. Accordingly, a verification allow voltage may be applied to the bit line BLk. The verification allow voltage may be set to the same value as the program allow voltage $V_{allow}$ or be set to a value different from a value of the program allow voltage $V_{allow}$. A verify voltage $V_{vfy\_n}$ may be applied to the selected word line. As a result, a verify result Verify_n of the nth program loop may be stored in the sensing latch 123d. The verify result Verify_n of the nth program loop may represent a pass.

Figure 8:
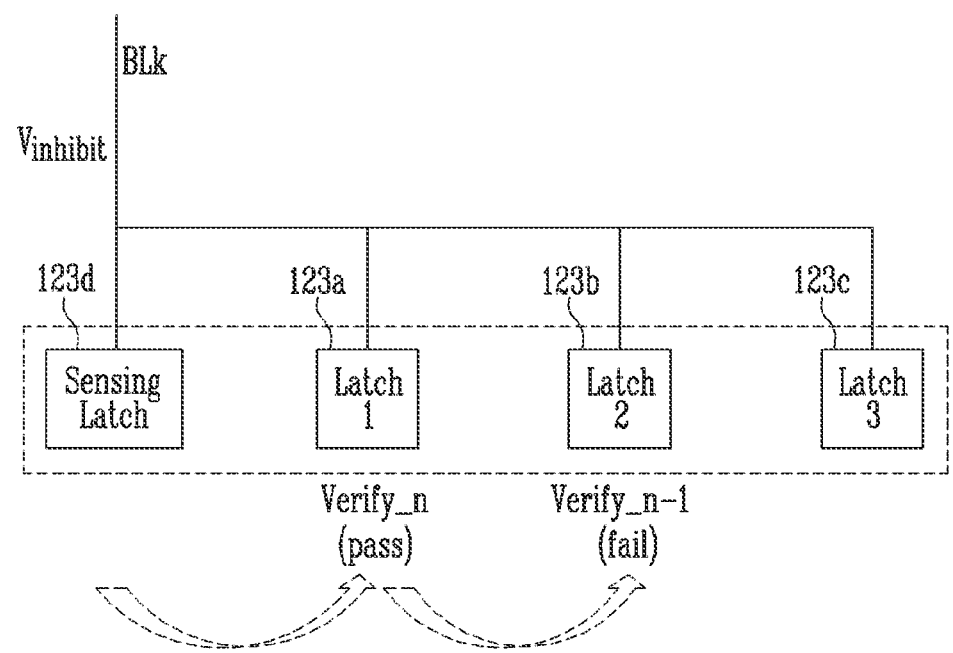

Referring to FIG. 8, a program voltage apply operation of an (n+1)th program loop may be performed. The verify result Verify_n of the nth program loop may be stored in the first latch 123a, and the verify result Verify_n−1 of the (n−1)th program loop may be stored in the second latch 123b. That is, before the program voltage apply operation of the (n+1)th program loop is performed, the verify result Verify_n−1 of the (n−1)th program loop, which has been stored in the first latch 123a, may be moved to the second latch 123b, and the verify result Verify_n of the nth program loop, which has been stored in the sensing latch 123d, may be moved to the first latch 123a. Specifically, an operation in which the verify result Verify_n−1 of the (n−1)th program loop, which has been stored in the first latch 123a, is moved to the second latch 123b may be performed before or after the verify operation of the nth program loop, and an operation in which the verify result Verify_n of the nth program loop, which has been stored in the sensing latch 123d, is moved to the first latch 123a may be performed between after the verify result Verify_n−1 of the (n−1)th program loop is moved to the second latch 123b and before the program voltage apply operation of the (n+1)th program loop is performed. The verify result Verify_n of the nth program loop may represent a pass. That is, as the verify result stored in the first latch 123a represents the pass, a program inhibit voltage $V_{inhibit}$ may be applied to the bit line BLk connected to the page buffer. As the program inhibit voltage $V_{inhibit}$ is applied to the bit line BLk connected to the page buffer, the threshold voltage of the memory cell connected to the page buffer through the bit line BLk may not be changed even when a program voltage $V_{pgm\_n+1}$ is applied to the selected word line.

Figure 9:
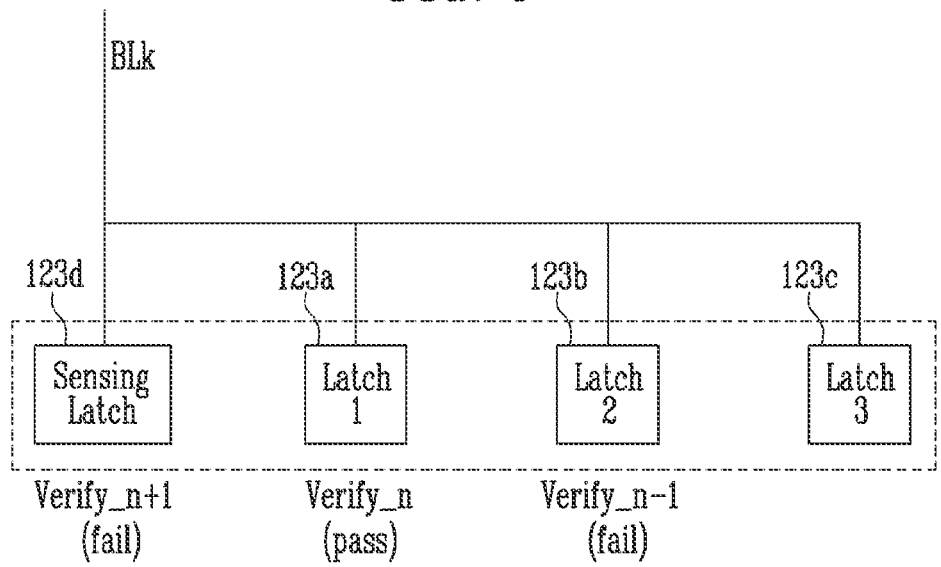

Referring to FIG. 9, a verify operation of the (n+1)th program loop may be performed on the memory cell connected to the page buffer through the bit line BLk. As a verify result stored in at least one of the first latch 123a and the second latch 123b represents a fail, the verify operation of the (n+1)th program loop may be performed on the memory cell connected to the page buffer through the bit line BLk. Accordingly, the verification allow voltage may be applied to the bit line BLk. The verification allow voltage may be set to the same value as the program allow voltage $V_{allow}$ or be set to a value different from the value of the program allow voltage $V_{allow}$. A verify voltage $V_{vfy\_n+1}$ may be applied to the selected word line. As a result, a verify result Verify_n+1 of the (n+1)th program loop may be stored in the sensing latch 123d. The verify result Verify_n+1 of the (n+1)th program loop may represent a fail.

Figure 10:
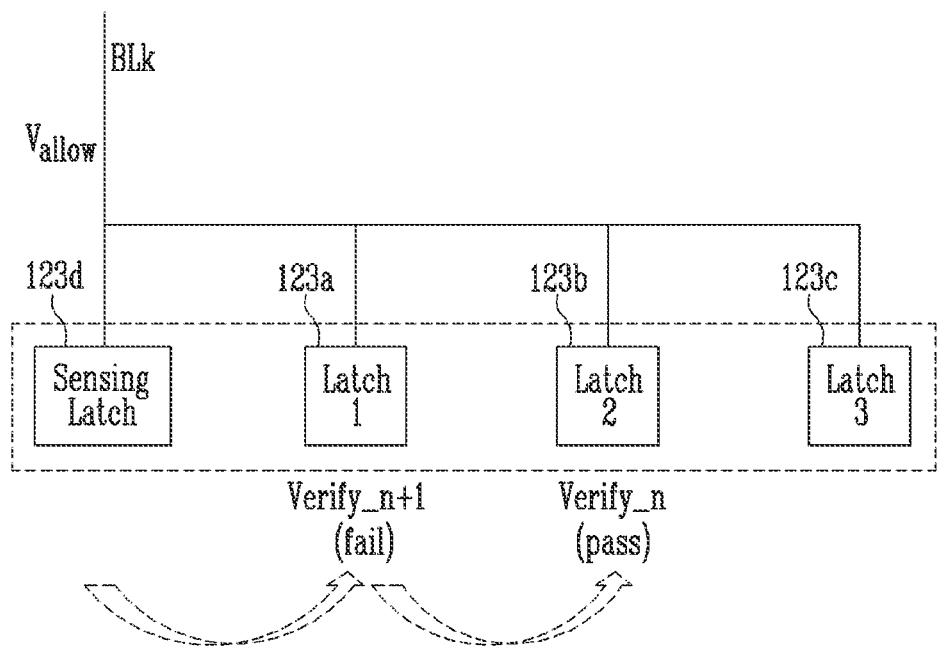

Referring to FIG. 10, a program voltage apply operation of an (n+2)th program loop may be performed. The verify result Verify_n+1 of the (n+1)th program loop may be stored in the first latch 123a, and the verify result Verify_n of the nth program loop may be stored in the second latch 123b. That is, before the program voltage apply operation of the (n+2)th program loop is performed, the verify result Verify_n of the nth program loop, which has been stored in the first latch 123a, may be moved to the second latch 123b, and the verify result Verify_n+1 of the (n+1)th program loop, which has been stored in the sensing latch 123d, may be moved to the first latch 123a. Accordingly, the verify result stored in the first latch 123a may be updated to the verify result Verify_n+1 of the (n+1)th program loop, and the verify result stored in the second latch 123b may be updated to the verify result Verify_n of the nth program loop. Specifically, an operation in which the verify result Verify_n of the nth program loop, which has been stored in the first latch 123a, is moved to the second latch 123b may be performed before or after the verify operation of the (n+1)th program loop, and an operation in which the verify result Verify_n+1 of the (n+1)th program loop, which has been stored in the sensing latch 123d, is moved to the first latch 123a may be performed between after the verify result Verify_n of the nth program loop is moved to the second latch 123b and before the program voltage apply operation of the (n+2)th program loop is performed. The verify result Verify_n+1 of the (n+1)th program loop may represent a fail. That is, as the verify result stored in the first latch 123a represents the fail, the program allow voltage $V_{allow}$ may be applied to the selected word line. A program voltage $V_{pgm\_n+2}$ may be applied to the bit line BLk connected to the page buffer. Accordingly, the threshold voltage of the memory cell connected to the page buffer through the bit line BLk to which the program allow voltage $V_{allow}$ is applied may be changed by a program voltage $V_{pgm}$.

Figure 11:
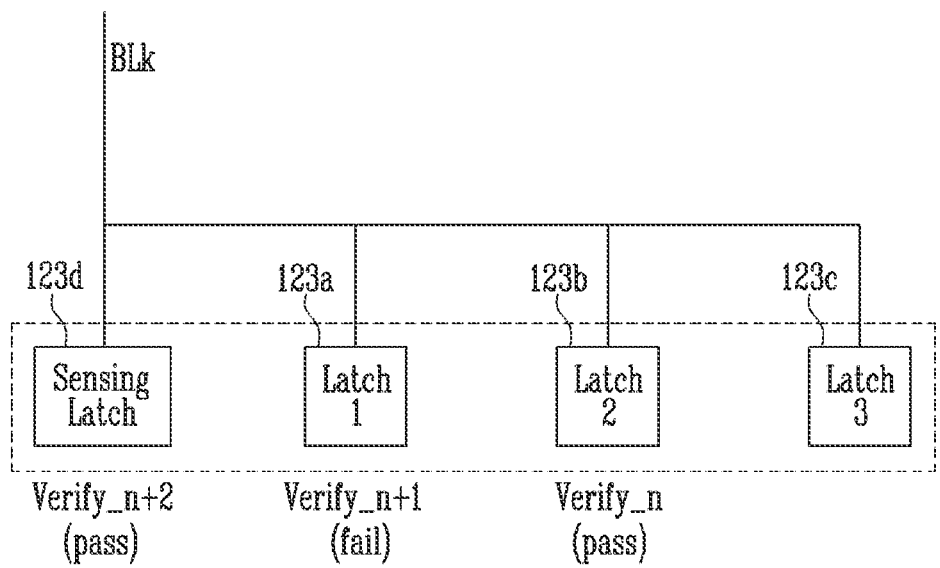

Referring to FIG. 11, a verify operation of the (n+2)th program loop may be performed on the memory cell connected to the page buffer through the bit line BLk. As a verify result stored in at least one of the first latch 123a and the second latch 123b represents a fail, the verify operation of the (n+2)th program loop may be performed on the memory cell connected to the page buffer through the bit line BLk. Accordingly, the verification allow voltage may be applied to the bit line BLk. The verification allow voltage may be set to the same value as the program allow voltage $V_{allow}$ or be set to a value different from the value of the program allow voltage $V_{allow}$. A verify voltage $V_{vfy\_n+2}$ may be applied to the selected word line. As a result, a verify result Verify_n+2 of the (n+2)th program loop may be stored in the sensing latch 123d. The verify result Verify_n+2 of the (n+2)th program loop may represent a pass.

Figure 12:
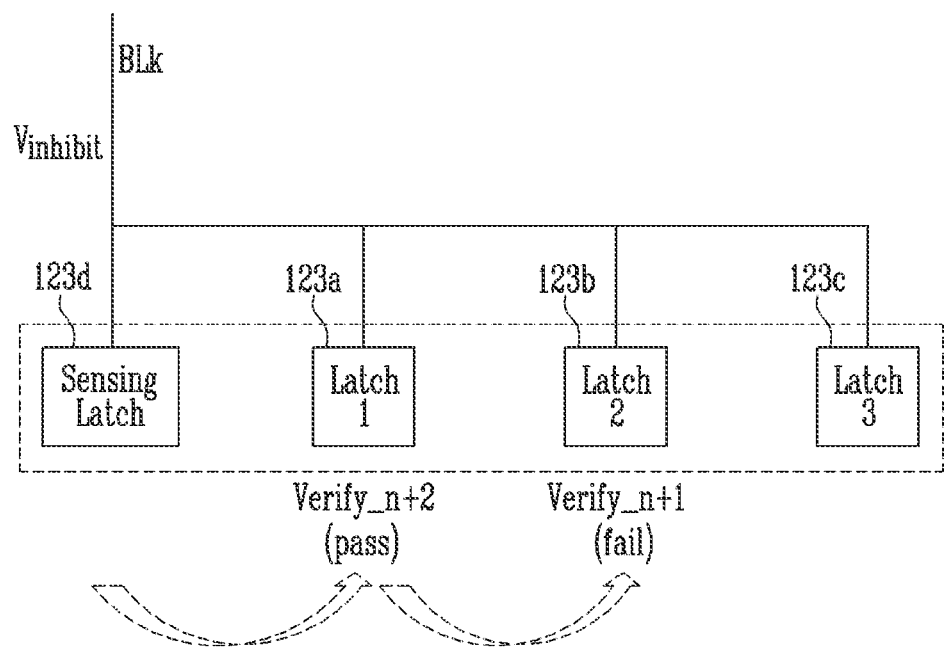

Referring to FIG. 12, a program voltage apply operation of an (n+3)th program loop may be performed. The verify result Verify_n+2 of the (n+2)th program loop may be stored in the first latch 123a, and the verify result Verify_n+1 of the (n+1)th program loop may be stored in the second latch 123b. That is, before the program voltage apply operation of the (n+3)th program loop is performed, the verify result Verify_n+1 of the (n+1)th program loop, which has been stored in the first latch 123a, may be moved to the second latch 123b, and the verify result Verify_n+2 of the (n+2)th program loop, which has been stored in the sensing latch 123d, may be moved to the first latch 123a. Accordingly, the verify result stored in the first latch 123a may be updated to the verify result Verify_n+2 of the (n+2)th program loop, and the verify result stored in the second latch 123b may be updated to the verify result Verify_n+1 of the (n+1)th program loop. Specifically, an operation in which the verify result Verify_n+1 of the (n+1)th program loop, which has been stored in the first latch 123a, is moved to the second latch 123b may be performed before or after the verify operation of the (n+2)th program loop, and an operation in which the verify result Verify_n+2 of the (n+2)th program loop, which has been stored in the sensing latch 123d, is moved to the first latch 123a may be performed between after the verify result Verify_n+1 of the (n+1)th program loop is moved to the second latch 123b and before the program voltage apply operation of the (n+3)th program loop is performed. The verify result Verify_n+2 of the (n+2)th program loop may represent a pass. That is, as the verify result stored in the first latch 123a represents the pass, the program inhibit voltage $V_{inhibit}$ may be applied to the bit line BLk connected to the page buffer. As the program inhibit voltage $V_{inhibit}$ is applied to the bit line BLk connected to the page buffer, the threshold voltage of the memory cell connected to the page buffer through the bit line BLk may not be changed even when a program voltage $V_{pgm\_n+3}$ is applied to the selected word line.

Figure 13:
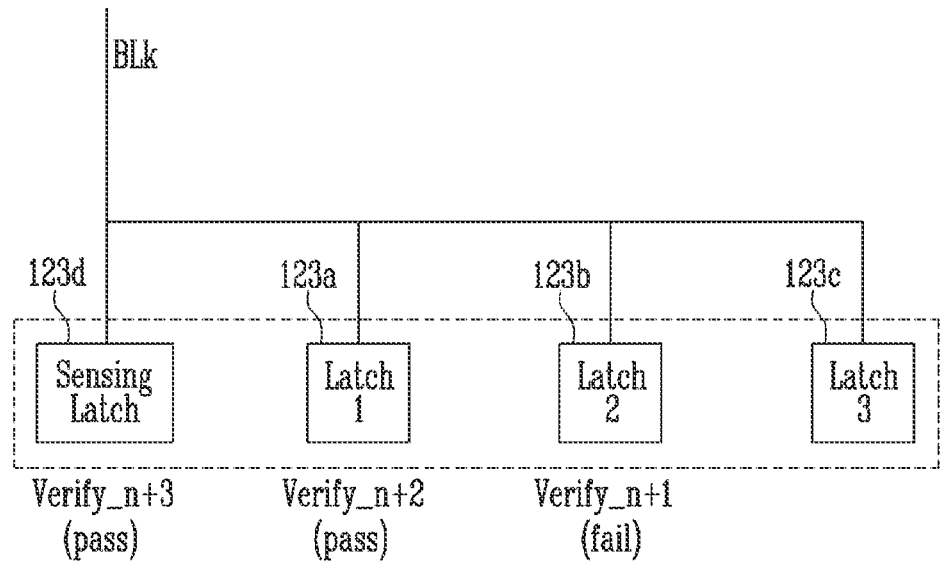

Referring to FIG. 13, a verify operation of the (n+3)th program loop may be performed on the memory cell connected to the page buffer through the bit line BLk. As a verify result stored in at least one of the first latch 123a and the second latch 123b represents a fail, the verify operation of the (n+3)th program loop may be performed on the memory cell connected to the page buffer through the bit line BLk. Accordingly, the verification allow voltage may be applied to the bit line BLk. The verification allow voltage may be set to the same value as the program allow voltage $V_{allow}$ or be set to a value different from the value of the program allow voltage $V_{allow}$. A verify voltage $V_{vfy\_n+3}$ may be applied to the selected word line. As a result, a verify result Verify_n+3 of the (n+3)th program loop may be stored in the sensing latch 123d. The verify result Verify_n+3 of the (n+3)th program loop may represent a pass.

Figure 14:
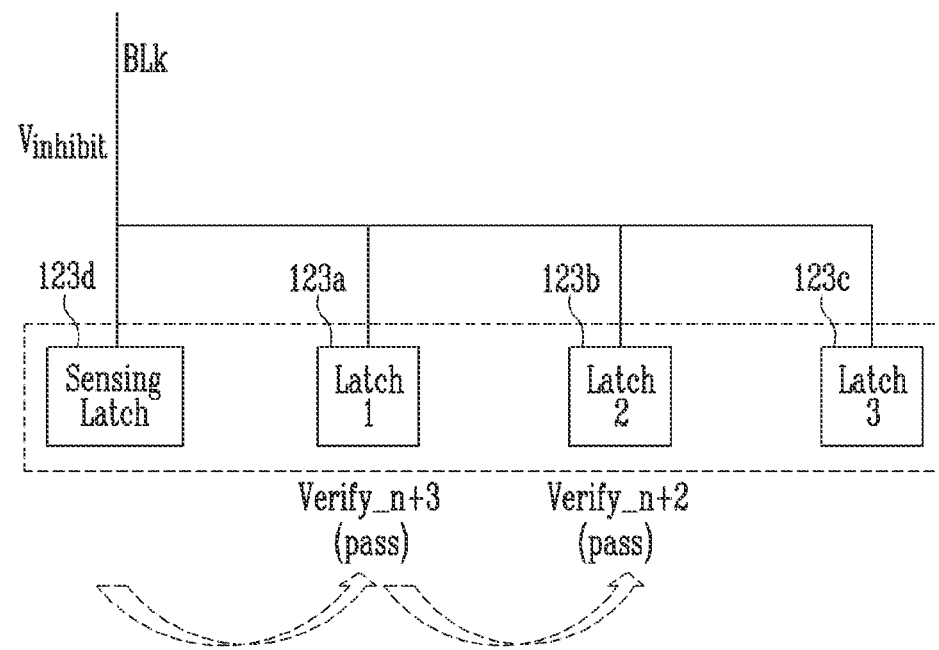

Referring to FIG. 14, a program voltage apply operation of an (n+4)th program loop may be performed. The verify result Verify_n+3 of the (n+3)th program loop may be stored in the first latch 123a, and the verify result Verify_n+2 of the (n+2)th program loop may be stored in the second latch 123b. That is, before the program voltage apply operation of the (n+4)th program loop is performed, the verify result Verify_n+2 of the (n+2)th program loop, which has been stored in the first latch 123a, may be moved to the second latch 123b, and the verify result Verify_n+3 of the (n+3)th program loop, which has been stored in the sensing latch 123d, may be moved to the first latch 123a. Accordingly, the verify result stored in the first latch 123a may be updated to the verify result Verify_n+3 of the (n+3)th program loop, and the verify result stored in the second latch 123b may be updated to the verify result Verify_n+2 of the (n+2)th program loop. Specifically, an operation in which the verify result Verify_n+2 of the (n+2)th program loop, which has been stored in the first latch 123a, is moved to the second latch 123b may be performed before or after the verify operation of the (n+3)th program loop, and an operation in which the verify result Verify_n+3 of the (n+3)th program loop, which has been stored in the sensing latch 123d, is moved to the first latch 123a may be performed between after the verify result Verify_n+2 of the (n+2)th program loop is moved to the second latch 123b and before the program voltage apply operation of the (n+4)th program loop is performed. The verify result Verify_n+3 of the (n+3)th program loop may represent a pass. That is, as the verify result stored in the first latch 123a represents the pass, the program inhibit voltage $V_{inhibit}$ may be applied to the bit line BLk connected to the page buffer. As the program inhibit voltage $V_{inhibit}$ is applied to the bit line BLk connected to the page buffer, the threshold voltage of the memory cell connected to the page buffer through the bit line BLk may not be changed even when a program voltage $V_{pgm\_n+4}$ is applied to the selected word line.

Figure 15:
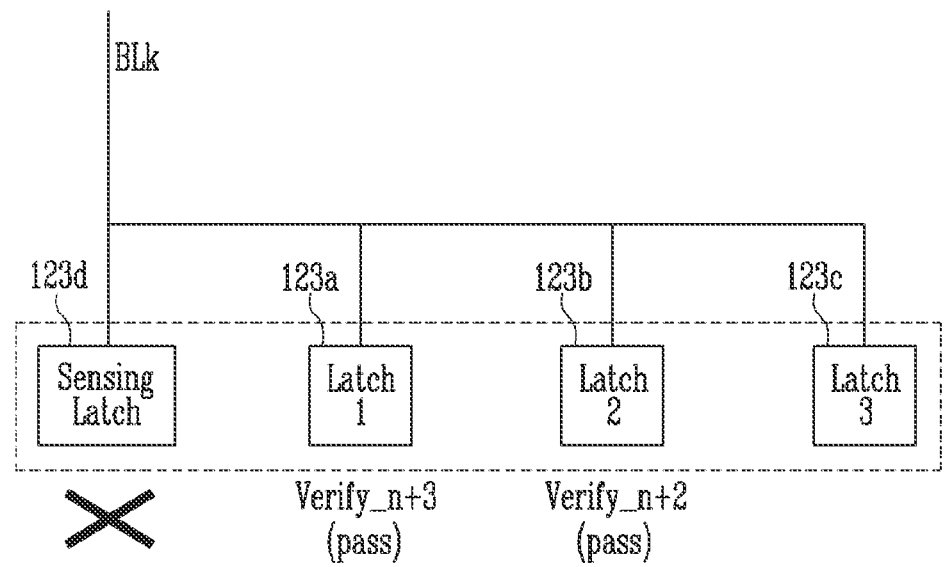

Referring to FIG. 15, a verify operation of the (n+4)th program loop may not be performed on the memory cell connected to the page buffer through the bit line BLk. As both the verify results stored in the first latch 123a and the second latch 123b represent a pass, the verify operation of the (n+4)th program loop may not be performed on the memory cell connected to the page buffer through the bit line BLk. Accordingly, a verification inhibit voltage may be applied to the bit line BLk. The verification inhibit voltage may be set to the same value as the program inhibit voltage $V_{inhibit}$ or be set to a value different from a value of the program inhibit voltage $V_{inhibit}$. A verify voltage $V_{vfy\_n+4}$ may be applied to the selected word line. As the program inhibit voltage $V_{inhibit}$ is applied to the bit line BLk connected to the page buffer, the threshold voltage of the memory cell connected to the page buffer through the bit line BLk may not be sensed even when the verify voltage $V_{vfy\_n+4}$ is applied to the selected word line. Accordingly, no verify result may be stored in the sensing latch 123d.

Figure 16:
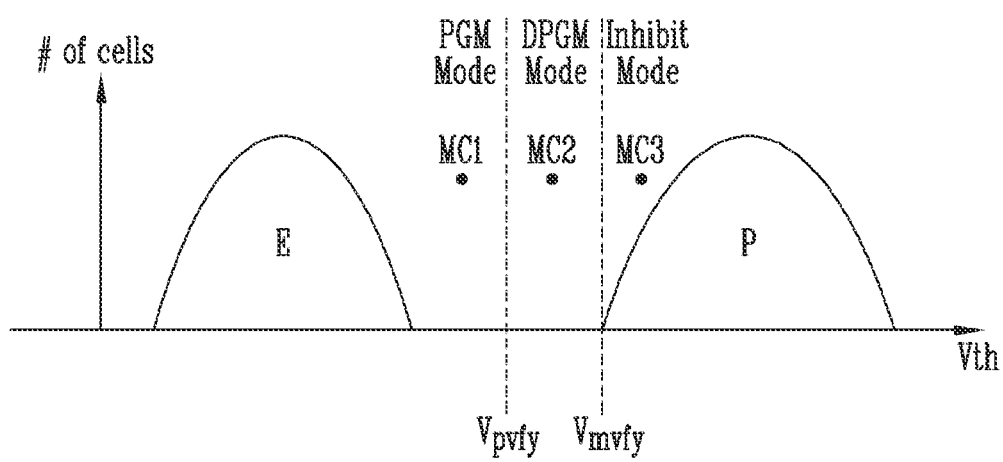
FIGS. 16 and 17 are diagrams illustrating a double program operation in accordance with an embodiment of the present disclosure.
Figure 17:
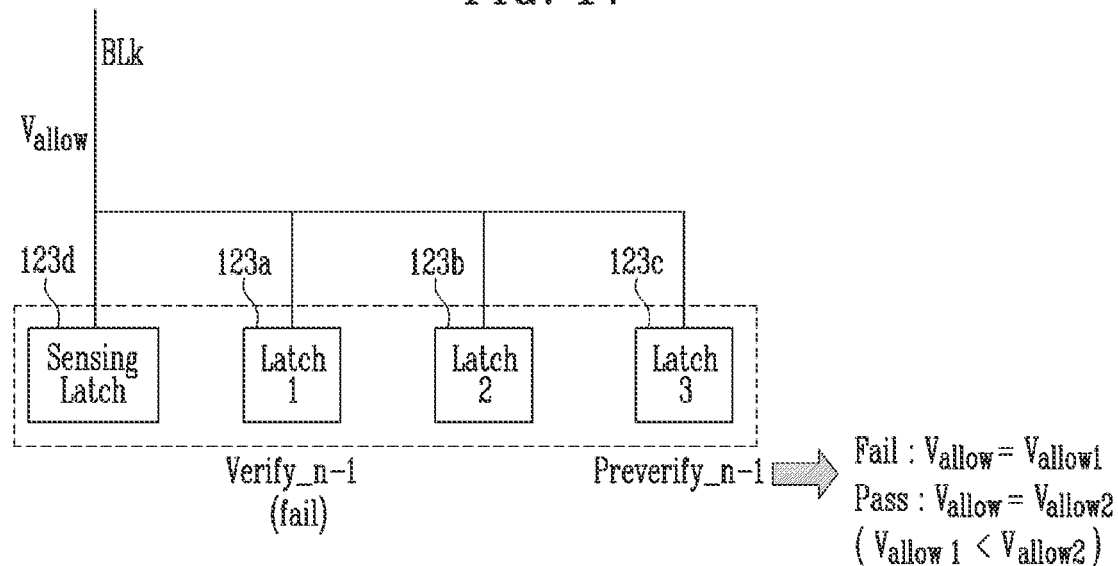

FIGS. 16 and 17 are diagrams illustrating a double program operation in accordance with an embodiment of the present disclosure.

Referring to FIG. 16, in the Double Program (DPGM) operation, a verify operation of a program operation may be performed using two verify voltage levels. The two verify voltage may be an auxiliary verify voltage $V_{pvfy}$ and a main verify voltage $V_{mvfy}$. The main verify voltage $V_{mvfy}$ is a verify voltage corresponding to a target state of the program operation, and may mean the same voltage as the verify voltage $V_{vfy}$ mentioned in FIGS. 3 to 15. The auxiliary verify voltage $V_{pvfy}$ may be a voltage for verifying a degree to which a program operation on a memory cell is performed at a level lower than the main verify voltage $V_{mvfy}$.

In FIG. 16, a case where the memory cell is a Single-Level Cell (SLC) storing one data bit is assumed and described. A target state of the program operation on the memory cell may be a first program state P. A state mode may be determined according to a verify result of the program operation on the memory cell. The state mode may include a first program mode PGM Mode, a second program mode DPGM Mode, and a program inhibit mode Inhibit Mode.

Because a threshold voltage of a first memory cell MC1 is lower than the auxiliary verify voltage $V_{pvfy}$, a state mode of the first memory cell MC1 may be the first program mode PGM Mode. Because a threshold voltage of a second memory cell MC2 is higher than the auxiliary verify voltage $V_{pvfy}$ and is lower than the main verify voltage $V_{mvfy}$, a state mode of the second memory cell MC2 may be the second program mode DPGM Mode. Because a threshold voltage of a third memory cell MC3 is higher than the main verify voltage $V_{mvfy}$, a state mode of the third memory cell MC3 may be the program inhibit mode Inhibit Mode.

For the first memory cell MC1 to reach the first program state P as a target state, it is necessary for a program operation to be rapidly performed. For the second memory cell MC2 to reach the first program state P as the target state, it is necessary for a program operation to be slowly performed. Because the third memory cell MC3 is in a state in which the third memory cell MC3 is completely programmed to the first program state P as the target state, it is necessary for a program operation to be inhibited.

Therefore, the program operation having a strength lower than a strength of the program operation on the first memory cell MC1 may be performed on the second memory cell MC2. A program strength may be determined according to a time for which a program pulse is applied, a number of times the program pulse is applied, and a potential difference of the program pulse.

For example, during a period in which the program pulse is applied to a selected word line, a first program allow voltage $V_{allow1}$ may be applied to a bit line connected to the first memory cell MC1, and a second program allow voltage $V_{allow2}$ higher than the first program allow voltage $V_{allow1}$ may be applied to a bit line connected to the second memory cell MC2. Because the second memory cell MC2 has a potential difference of a program pulse applied thereto, which is smaller than a potential difference of a program pulse applied to the first memory cell MC1, the program operation having the strength lower than the strength of the program operation on the first memory cell MC1 may be performed on the second memory cell MC2.

The program operation on the third memory cell MC3 may be limited. For example, while the program pulse is applied to the selected word line, a program inhibit voltage $V_{inhibit}$ may be applied to a bit line connected to the third memory cell MC3. Because a potential difference of a program pulse applied to the third memory cells MC3 becomes lower than a potential difference for increasing a threshold voltage of the memory cell, the program operation of increasing the threshold voltage of the third memory cell MC3 may be limited.

Referring to FIG. 17, the program voltage apply operation of the nth program loop may be performed. The verify result Verify_n−1 of the (n−1)th program loop may be stored in the first latch 123a. The verify result Verify_n−1 of the (n−1)th program loop may represent a fail. As the verify result stored in the first latch 123a represents the fail, a program allow voltage $V_{allow}$ may be applied to the bit line BLk connected to the page buffer. A program voltage $V_{pgm}$ may be applied to the selected word line. Accordingly, the threshold voltage of the memory cell connected to the page buffer through the bit line BLk to which the program allow voltage $V_{allow}$ is applied may be changed by a program voltage $V_{pgm\_n}$.

An auxiliary verify result Preverify_n−1 of the (n−1)th program loop may be stored in the third latch 123c. When the auxiliary verify result Preverify_n−1 of the (n−1)th program loop, which is stored in the third latch 123c, represents a fail, a state mode of the memory cell connected to the page buffer through the bit line BLk may be the first program mode PGM Mode described in FIG. 16. Accordingly, the program allow voltage $V_{allow}$ applied to the bit line BLk connected to the page buffer may be the first program allow voltage $V_{allow1}$.

When the auxiliary verify result Preverify_n−1 of the (n−1)th program loop, which is stored in the third latch 123c, represents a pass, the state mode of the memory cell connected to the page buffer through the bit line BLk may be the second program mode DPGM Mode described in FIG. 16. Accordingly, the program allow voltage $V_{allow}$ applied to the bit line BLk connected to the page buffer may be the second program allow voltage $V_{allow2}$. That is, the page buffer in accordance with the embodiment of the present disclosure may further include a third latch for storing an auxiliary verify result according an auxiliary verify operation, and control a voltage connected to bit lines connected to memory cells, based on the auxiliary verify result according to the auxiliary verify operation. Accordingly, the threshold voltage distribution of the memory cells can be further improved.

Figure 18:
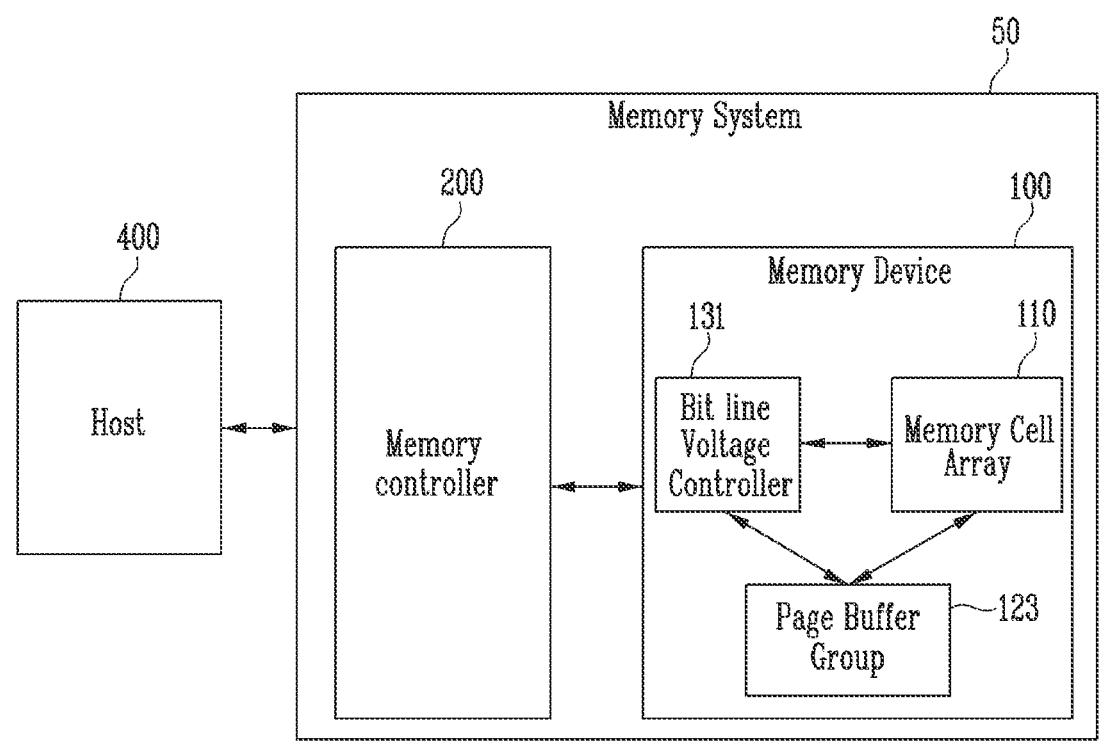
FIG. 18 is a block diagram illustrating a memory system in accordance with an embodiment of the present disclosure.

FIG. 18 is a block diagram illustrating a memory system in accordance with an embodiment of the present disclosure.

Referring to FIG. 18, the memory system 50 may include a memory device 100 and a memory controller 200.

The memory system 50 may be a device for storing data under the control of a host 400, such as a mobile phone, a smart phone, an MP3 player, a laptop computer, a desktop computer, a game console, a display device, a tablet PC, or an in-vehicle infotainment system. The memory system 50 may be implemented as any one of various types of storage devices according to a host interface that is a communication scheme with the host 400. The memory system 50 may be implemented as any one of various kinds of package types.

The memory device 100 may store data or use stored data. In an embodiment, the memory device 100 may be the memory device 100 shown in FIG. 1. Specifically, the memory device 100 may be operated under the control of the memory controller 200. The memory device 100 may be a nonvolatile memory device or a volatile memory device.

The memory device 100 may include a memory cell array 110 including a plurality of memory cells. The memory cell array 110 may include a plurality of memory blocks. Each memory block may include a plurality of memory cells, and one memory block may include a plurality of pages. The page may be a unit for storing data in the memory device 100 or reading data stored in the memory device 100.

Also, the memory device 100 may include a page buffer group 123. In accordance with an embodiment, the page buffer group 123 may include a plurality of page buffers, and the plurality of page buffers may be connected to the memory cell array 110 respectively through a plurality of bit lines. Each of the page buffers may include a first latch for storing a verify result according to a verify operation of an nth program loop among a plurality of program loops and a second latch for storing a verify result according to a verify operation of an (n−1)th program loop. The page buffer may be identical to the page buffer group or the page buffer, which is described with reference to FIGS. 1 to 17.

Also, the memory device 100 may include a bit line voltage controller 131. The bit line voltage controller 131 may determine a bit line voltage to be applied to each of the bit lines connected to the memory cells, based on the verify results stored in the first latch and the second latch. The bit line voltage controller 131 may be included in the control logic 130 shown in FIG. 1.

The memory device 100 may receive a command and an address from the memory controller 200. The memory device 100 may access an area selected by the received address in the memory cell array. That the selected area is accessed may mean that an operation corresponding to the received command is performed on the selected area. For example, the memory device 100 may perform a write operation (program operation), a read operation, and an erase operation. The program operation may mean an operation in which the memory device 100 records data in the area selected by the address. The read operation may mean an operation in which the memory device 100 reads data from the area selected by the address. The erase operation may mean an operation in which the memory device 100 erases data stored in the area selected by the address.

The memory controller 200 may control overall operations of the memory system 50. Specifically, when power is applied to the memory system 50, the memory controller 200 may execute firmware (FW). The FW may include a Host Interface Layer (HIL) for receiving a request input from the host 400 or outputting a response to the host 400, a Flash Translation Layer (FTL) for managing an operation between an interface of the host 400 and an interface of the memory device 100, and a Flash Interface Layer (FIL) for providing a command to the memory device 100 or receiving a response from the memory device 100.

The memory controller 200 may receive data and a Logical Address (LA), which are input from the host 400, and map the LA to a Physical Address (PA) representing an address of memory cells in which data included in the memory device 100 is to be stored. The LA may be a Logical Block Address (LBA), and the PA may be a Physical Block Address (PBA).

The memory controller 200 may control the memory device 100 to perform a program operation, a read operation, an erase operation, or the like in response to a request from the host 400. In the program operation, when the memory controller 200 receives a write request from the host 400, the memory controller 200 may control the memory device 100 to perform a program operation corresponding to the write request. More specifically, the memory controller 200 may provide the memory device 100 with a program command, a PBA, and data.

The memory controller 200 may control the memory device 100 to autonomously perform a program operation, a read operation, or an erase operation regardless of any request from the host 400. For example, the memory controller 200 may control the memory device 100 to perform a program operation, a read operation, or an erase operation, which is used to perform a background operation including wear leveling, garbage collection, read reclaim, and the like.

The host 400 may communicate with the memory system 50 by using at least one of various communication schemes.

Figure 19:
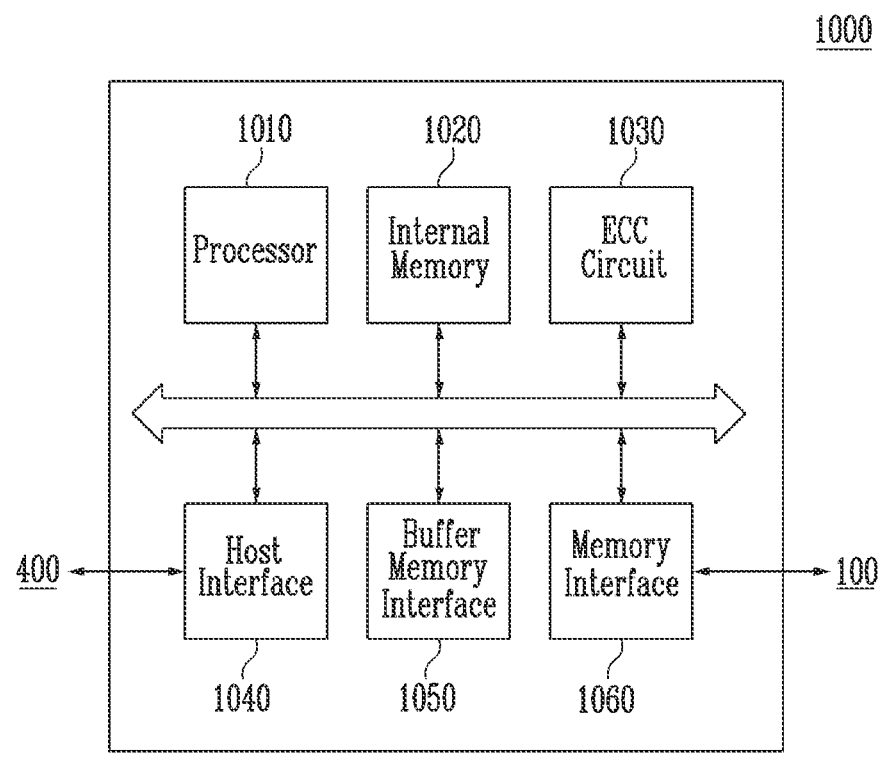
FIG. 19 is a diagram illustrating another embodiment of a memory controller shown in FIG. 18.

FIG. 19 is a diagram illustrating another embodiment of the memory controller shown in FIG. 18.

Referring to FIG. 19, a memory controller 1000 may include a processor 1010, an internal memory 1020, an error correction code (ECC) circuit 1030, a host interface 1040, a buffer memory interface 1050, and a memory interface 1060.

The processor 1010 may perform various calculations for controlling the memory device 100 or generate various commands. When the processor 1010 receives a request from the host 400, the processor 1010 may generate a command according to the received request, and transmit the generated command to a queue controller (not shown). The processor 1010 may control a subsequent operation on the memory device 100, based on a verify result which the memory interface receives from the memory device 100.

The internal memory 1020 may store various information necessary for operation of the memory controller 1000. For example, the internal memory 1020 may include logical and physical address map tables.

The ECC circuit 1030 is configured to detect and correct an error of data received from the memory device 100 by using an error correction code (ECC). The processor 1010 may adjust a read voltage according to an error detection result of the ECC circuit 1030, and control the memory device 100 to perform re-reading. In an embodiment, an error correction block may be provided as a component of the memory controller 1000.

The host interface 1040 may exchange a command, an address, and data between the memory controller 1000 and the host 400. For example, the host interface 1040 may receive a request, an address, data, and the like from the host 400, and output data read from the memory device to the host 400. The host interface 1040 may communicate with the host 400 by using various protocols.

The buffer memory interface 1050 may transfer data between the processor 1010 and a buffer memory (not shown). The buffer memory (not shown) may be used as a working memory or a cache memory of the memory controller 1000, and store data used in the memory system 50. The buffer memory may be used as a read buffer, a write buffer, a map buffer, or the like by the processor 1010.

The memory interface 1060 may exchange a command, an address, data, and the like between the memory controller 1000 and the memory device 100. For example, the memory interface 1060 may 1060 may transfer a command, an address, data, and the like to the memory device 100 through a channel, and receive data and the like from the memory device 100. The memory interface 1060 may perform a program operation on the memory device 100 according to an instruction of the processor 1010. The program operation may include a plurality of program loops, and each of the program loops may include a program voltage apply operation and a verify operation. Also, the memory interface 1060 may 1060 may receive a result of the program operation from the memory device 100.

Figure 20:
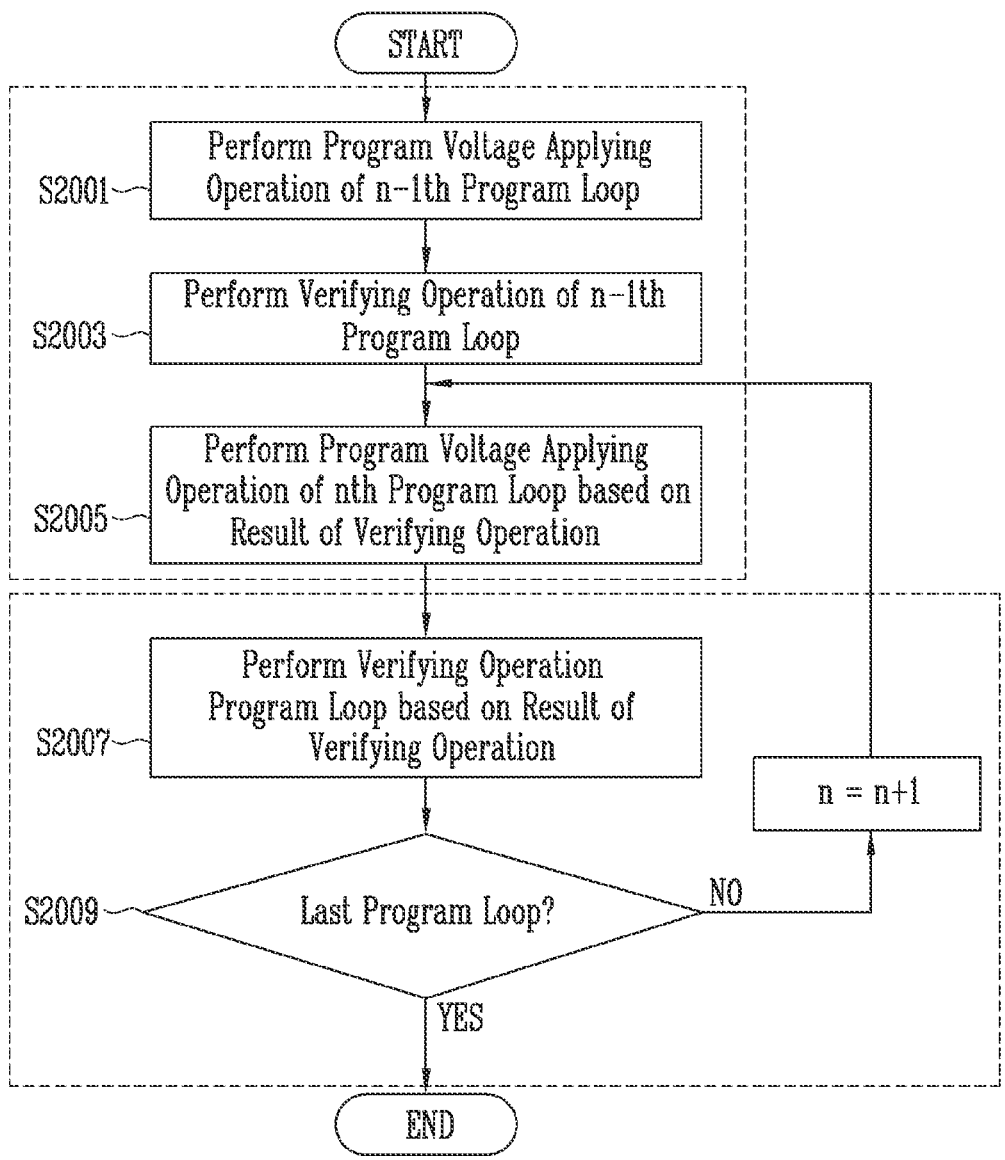
FIG. 20 is a flowchart illustrating an operating method of the memory device in accordance with an embodiment of the present disclosure.

FIG. 20 is a flowchart illustrating an operating method of the memory device in accordance with an embodiment of the present disclosure.

Referring to FIG. 20, in operation S2001, a program voltage apply operation of an (n−1)th program loop may be performed. In operation S2003, a verify operation of the (n−1)th program loop may be performed. A program loop may include a program voltage apply operation and a verify operation as described above. The program voltage apply operation may be an operation of applying a program voltage to selected memory cells. The verify operation may be an operation of verifying a program state of memory cells, based on a verify voltage.

In operation S2005, a program voltage apply operation of an nth program loop may be performed based on a pre-performed verify result. The pre-performed verify result may be stored in a page buffer in the memory device. More specifically, the pre-performed verify result may be stored in latches included in the page buffer. In an embodiment, the program voltage apply operation of the nth program loop may be performed based on a verify result stored in a first latch. A verify result of the (n−1)th program loop may be stored in the first latch.

In operation S2007, a verify operation of the nth program loop may be performed based on a pre-performed verify result. The pre-performed verify result may be stored in a page buffer in the memory device. More specifically, the pre-performed verify result may be stored in latches included in the page buffer. In an embodiment, the verify operation of the nth program loop may be performed based on a verify result stored in the first latch and a verify result stored in a second latch. A verify result of the nth program loop may be stored in the first latch, and the verify result of the (n−1)th program loop may be stored in the second latch.

In operation S2009, it may be checked whether the nth program loop is a last program loop. For example, when a sensing result of a verify operation on all program states represents a pass, the nth program loop may be the last program loop. When the nth program loop is the last program loop, a program operation may be ended. When the nth program loop is not the last program loop, a next program loop is repeatedly performed.

Figure 21:
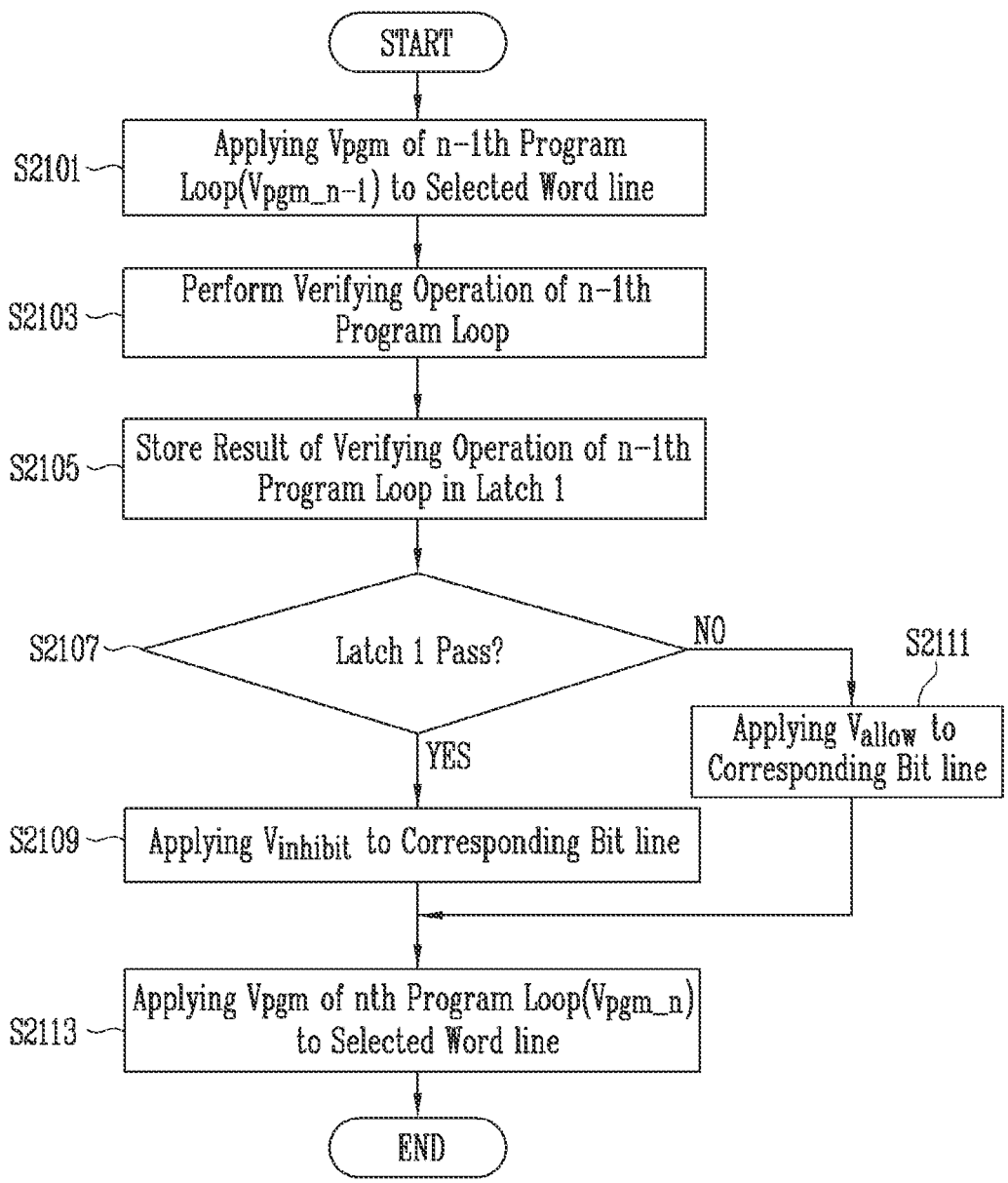
FIG. 21 is a flowchart illustrating in more detail a partial operation shown in FIG. 20.

FIG. 21 is a flowchart illustrating in more detail a partial operation shown in FIG. 20.

Referring to FIG. 21, an operation process to the program voltage apply operation of the nth program loop can be seen in more detail. That is, FIG. 21 may illustrate in more detail the operations S2001 to S2005 shown in FIG. 20 surrounded by an upper dashed box.

In operation S2101, a program voltage $V_{pgm\_n-1}$ of the (n−1)th program loop may be applied to a selected word line to which a selected memory cell is connected. This may correspond to the operation S2001 shown in FIG. 20.

In operation S2103, the verify operation of the (n−1)th program loop may be performed on the selected memory cell, and a verify result according to the verify operation of the (n−1)th program loop may be stored in a first latch in a page buffer connected to the selected memory cell through a bit line, in operation S2105. The operations S2103 and S2105 may correspond to the S2003 shown in FIG. 20.

In operation S2107, it may be checked whether the verify result stored in the first latch represent a pass. The verify result stored in the first latch may be a verify result of the selected memory cell according to the verify operation of the (n−1)th program loop.

When the verify result stored in the first latch represents the pass, in operation S2109, a program inhibit voltage $V_{inhibit}$ may be applied to the bit line corresponding to the selected memory cell. When the verify result stored in the first latch represents a fail, in operation S2111, a program allow voltage $V_{allow}$ may be applied to the bit line corresponding to the selected memory cell.

In operation S2113, a program voltage $V_{pgm\_n}$ of the nth program loop may be applied to the selected word line. A bit line voltage according to the operation S2109 or S2111 may be applied to the bit line to which the selected memory cell is connected. The operations S2107 to S2113 may correspond to the operation S2005 shown in FIG. 20.

FIG. 22 is a flowchart illustrating in more detail another partial operation shown in FIG. 20.

Referring to FIG. 22, an operation process from the verify operation of the nth program loop can be seen in more detail.

That is, FIG. 22 may illustrate in more detail operations from the operation S2007 and later shown in FIG. 20 surrounded by a lower dashed box.

In operation S2201, it may be checked whether both the verify result stored in the first latch and the verify result stored in the second latch represent a pass. The verify result stored in the first latch may be a verify result of the selected memory cell according to the verify operation of the (n−1)th program loop, and the verify result stored in the second latch may be a verify result of the selected memory cell according to a verify operation of an (n−2)th program loop.

When it is determined that both the verify result stored in the first latch and the verify result stored in the second latch does not represent the pass, i.e., when at least one of the verify result stored in the first latch and the verify result stored in the second latch represents a fail, in operation S2203, the verify operation of the nth program loop may be performed.

Before the verify operation of the nth program loop is performed or after the verify operation of the nth program loop is performed, in operation S2205, the verify result of the (n−1)th program loop, which has been stored in the first latch, may be updated in the second latch. In addition, after both the operations S2203 and S2205 are performed, in operation S2207, the verify result of the nth program loop may be updated in the first latch.

When it is determined that both the verify result stored in the first latch and the verify result stored in the second latch represent the pass in the operation S2201, in operation S2209, the verify operation of the nth program loop may not be performed. For example, a verification inhibit voltage may be applied to the bit line connected to the selected memory cell, so that the verify operation of the nth program loop is not performed. The operations S2201 to S2209 may correspond to the operation S2007 shown in FIG. 20.

In operation S2211, it may be checked whether the nth program loop is a last program loop. When the nth program loop is the last program loop, the program operation may be ended. The operation S2211 may correspond to the operation S2009 shown in FIG. 20.

When the nth program loop is not the last program loop in the operation S2211, in operation S2213, it may be checked whether the verify result stored in the first latch represents a pass. The verify result stored in the first latch may be a verify result of the selected memory cell according to the verify operation of the nth program loop.

When the verify result stored in the first latch represents the pass, in operation S2215, the program inhibit voltage $V_{inhibit}$ may be applied to the bit line corresponding to the selected memory cell. When the verify result stored in the first latch represents a fail, in operation S2217, the program allow voltage $V_{allow}$ may be applied to the bit line corresponding to the selected memory cell.

In operation S2219, a program voltage $V_{pgm\_n+1}$ of an (n+1)th program loop may be applied to the selected word line. A bit line voltage according to the operation S2215 or S2217 may be applied to the bit line to which the selected memory cell is connected. The operations S2213 to S2219 may correspond to the operation S2005 performed after the operation S2009 shown in FIG. 20.

After that, by returning to the operation S2201, the verify operation of the (n+1)th program loop and program loops subsequent thereto may be repeatedly performed.

In accordance with the present disclosure, there can be provided a memory device, an operating method of a memory device, and a memory system, which can reduce an error of a verify operation or degradation of program end cells.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
a memory cell array including a plurality of memory cells;
a peripheral circuit including a plurality of page buffers respectively connected to the plurality of memory cells through a plurality of bit lines and a voltage generating circuit configured to selectively output a program voltage and a verify voltage; and
a control circuit configured to control the peripheral circuit to perform a plurality of program loops each including a program voltage apply operation of applying a program voltage to selected memory cells among the memory cells and a verify operation of verifying a program state of the selected memory cells, based on the verify voltage,
wherein each of the plurality of page buffers includes:
a first latch configured to store a verify result according to the verify operation of an nth program loop among the plurality of program loops; and
a second latch configured to store a verify result according to the verify operation of an (n−1)th program loop among the plurality of program loops,
wherein the control circuit determines a bit line voltage to be applied to each of the bit lines in an (n+1)th program loop among the plurality of program loops, based on the verify results stored in the first latch and the second latch, and
wherein, after the program voltage apply operation of the (n+1)th program loop has ended, the control circuit updates the verify result of the nth program loop, which is stored in the first latch, in the second latch.

2. The memory device of claim 1, wherein, when the program voltage apply operation of the (n+1)th program loop is performed, the control circuit controls the peripheral circuit such that a program allow voltage is applied to a bit line connected to a page buffer in which the verify result stored in the first latch represents a fail.

3. The memory device of claim 1, wherein, when the program voltage apply operation of the (n+1)th program loop is performed, the control circuit controls the peripheral circuit such that a program inhibit voltage is applied to a bit line connected to a page buffer in which the verify result stored in the first latch represents a pass.

4. The memory device of claim 1, wherein the control circuit controls the peripheral circuit to perform a verify operation of the (n+1)th program loop on a memory cell connected to a page buffer in which the verify result stored in the first latch represents a pass and the verify result stored in the second latch represents a fail.

5. The memory device of claim 1, wherein the control circuit controls the peripheral circuit not to perform a verify operation of the (n+1)th program loop on a memory cell connected to a page buffer in which the verify result stored in the first latch represents a pass and the verify result stored in the second latch represents the pass.

6. The memory device of claim 1, wherein, after the verify result of the nth program loop, which is stored in the first latch, is updated in the second latch, a verify result of the (n+1)th program loop is updated in the first latch.

7. The memory device of claim 1, wherein the voltage generating circuit is further configured to output an auxiliary verify voltage different from the verify voltage.

8. The memory device of claim 7, wherein each of the program loops further includes an auxiliary verify operation of verifying a program state of the selected memory cells, based on the auxiliary verify voltage.

9. The memory device of claim 8, wherein each of the page buffers further includes a third latch configured to store an auxiliary verify result according to the auxiliary verify operation of the nth program loop.

10. The memory device of claim 9, wherein the control circuit is configured to determine the program voltage of the (n+1)th program loop, based on the auxiliary verify result stored in the third latch.

11. A method of operating a memory device, the method comprising:
performing an nth program loop including a program voltage apply operation and a verify operation on a selected memory cell among a plurality of memory cells;
storing a verify result according to the verify operation of the nth program loop in a first latch of a page buffer connected to the selected memory cell through a bit line;
performing an (n+1)th program loop while applying, to the bit line, a bit line voltage determined based on a verify result according to a verify operation of an (n−1)th program loop, which is pre-stored in a second latch of the page buffer, and the verify result according to the verify operation of the nth program loop, which is stored in the first latch; and
updating the verify result of the nth program loop, which is stored in the first latch, in the second latch, after a program voltage apply operation of the (n+1)th program loop.

12. The method of claim 11, wherein, when a program voltage apply operation of the (n+1)th program loop is performed, a program allow voltage is applied to the bit line when the verify result stored in the first latch represents a fail.

13. The method of claim 11, wherein, when a program voltage apply operation of the (n+1)th program loop is performed, a program inhibit voltage is applied to the bit line when the verify result stored in the first latch represents a pass.

14. The method of claim 11, wherein, when the verify result stored in the first latch represents a pass and the verify result stored in the second latch represents a fail, a verify operation of the (n+1)th program loop is performed on the selected memory cell.

15. The method of claim 11, wherein, when the verify result stored in the first latch represents a pass and the verify result stored in the second latch represents the pass, a verify operation of the (n+1)th program loop is not performed on the selected memory cell.

16. The method of claim 11, further comprising updating a verify result of the (n+1)th program loop in the first latch, after the updating of the verify result of the nth program loop, which is stored in the first latch, in the second latch.

17. A memory system comprising:
a memory device including a plurality of memory cells, the memory device including a plurality of page buffers respectively connected to the plurality of memory cells through a plurality of bit lines; and
a memory controller configured to control the memory device to perform a program operation when a write request is received from the outside,
wherein the program operation includes a plurality of program loops each including a program voltage apply operation of applying a program voltage to selected memory cells among the memory cells and a verify operation of verifying a program state of the selected memory cells,
wherein each of the plurality of page buffers includes:
a first latch configured to store a verify result according to a verify operation of an nth program loop among the plurality of program loops; and
a second latch configured to store a verify result according to a verify operation of an (n−1)th program loop among the plurality of program loops, and
wherein bit line voltages to be respectively applied to the bit lines in an (n+1)th program loop among the plurality of program loops are determined based on the verify results stored in the first latch and the second latch, and
wherein, after the program voltage apply operation of the (n+1)th program loop has ended, the memory controller updates the verify result of the nth program loop, which is stored in the first latch, in the second latch.

\* \* \* \* \*